H. HASTINGS.
MACHINE FOR LOCATING AND EMBOSSING BUTTONS.
APPLICATION FILED FEB. 23, 1912.
1,272,435.
Patented July 16, 1918.
11 SHEETS—SHEET 1.
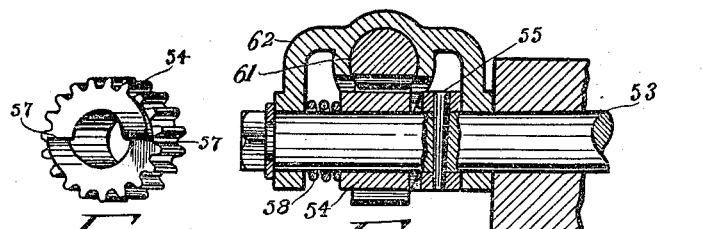
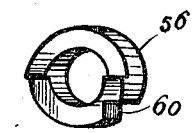
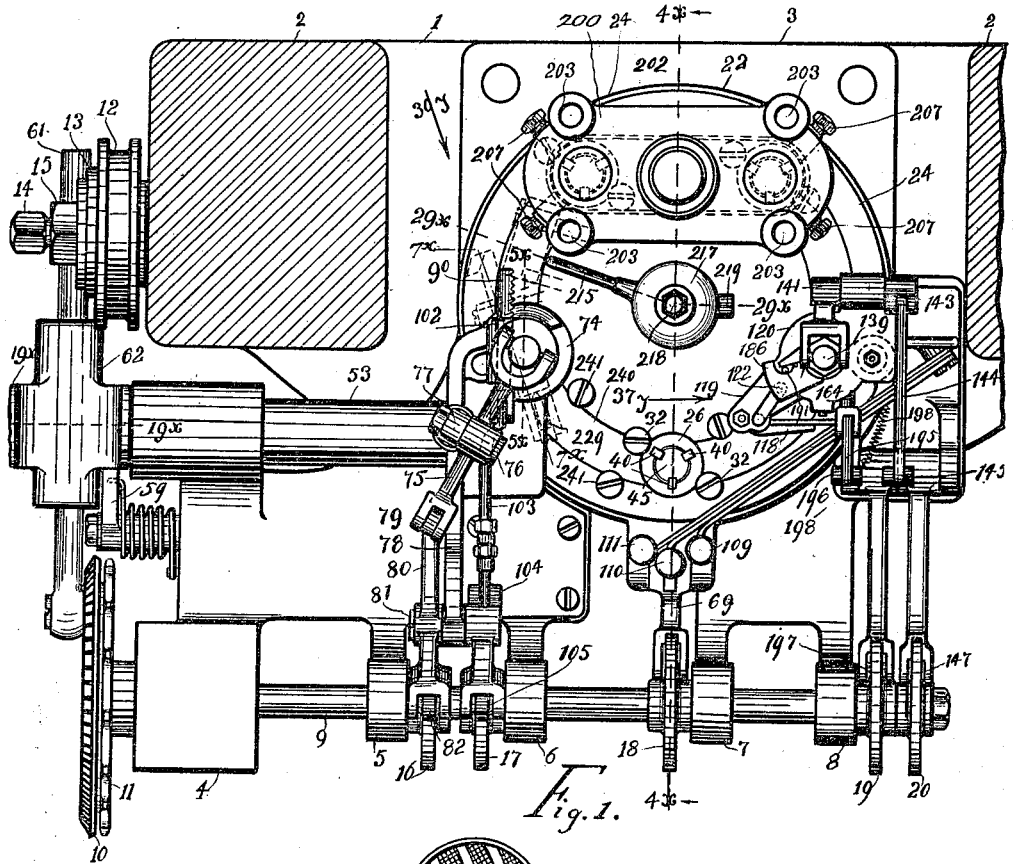
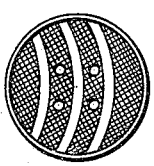
Witnesses
Eric Ischinger
Lena M. Ash
Inventor
Herbert Hastings
By Frank Keifs
Attorney

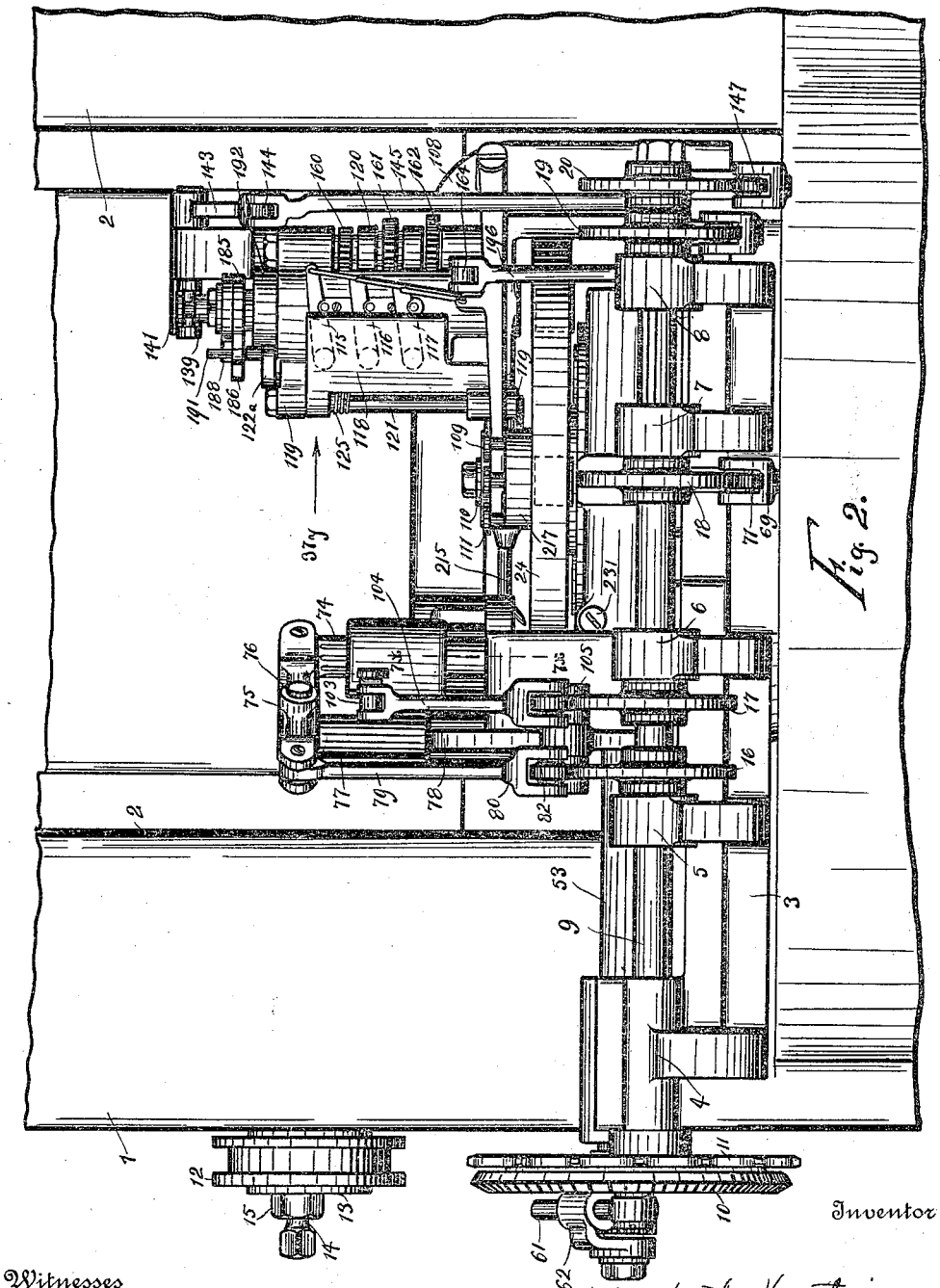

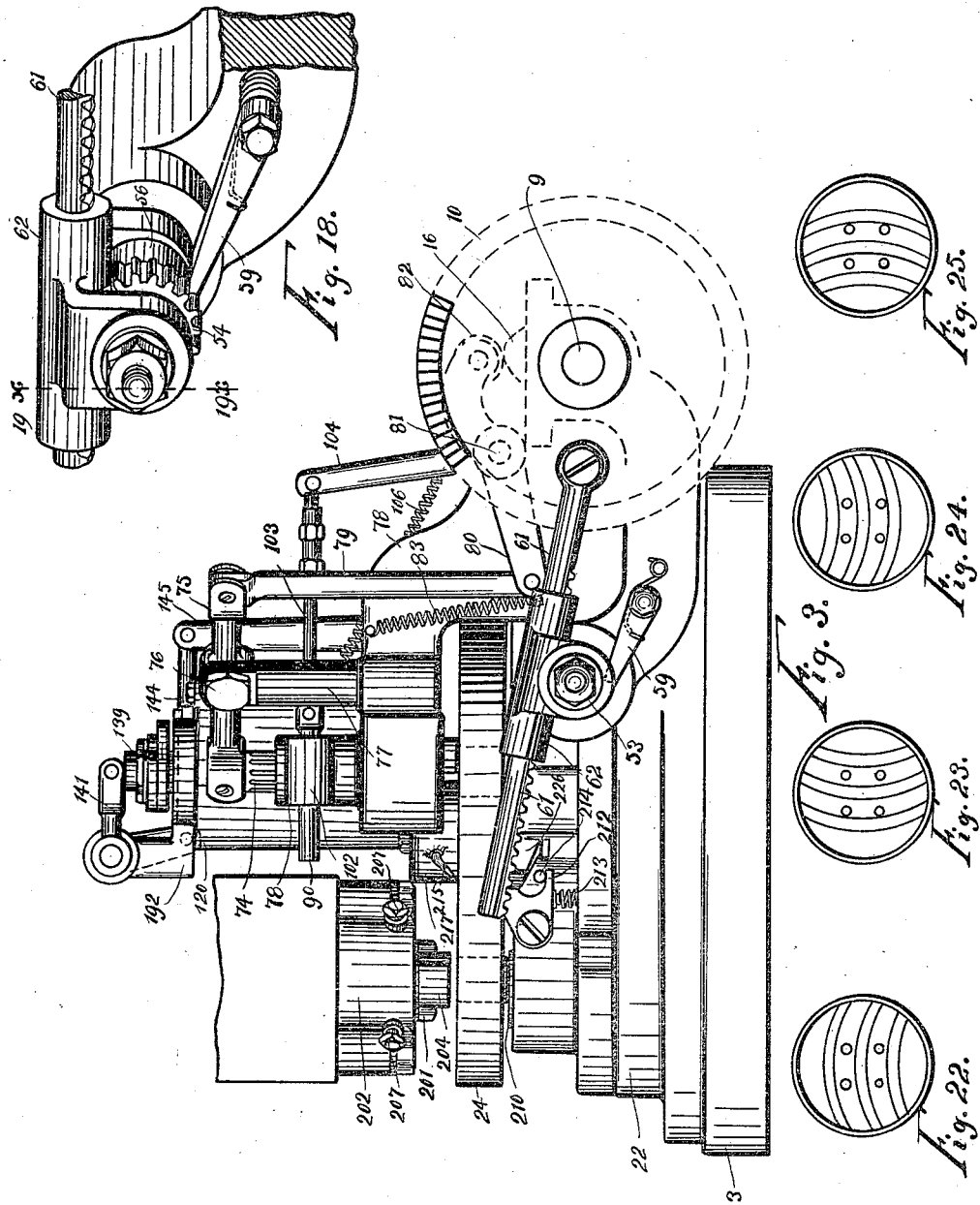

H. HASTINGS.
MACHINE FOR LOCATING AND EMBOSSING BUTTONS.
APPLICATION FILED FEB. 23, 1912.
1,272,435.
Patented July 16, 1918.
11 SHEETS—SHEET 4.
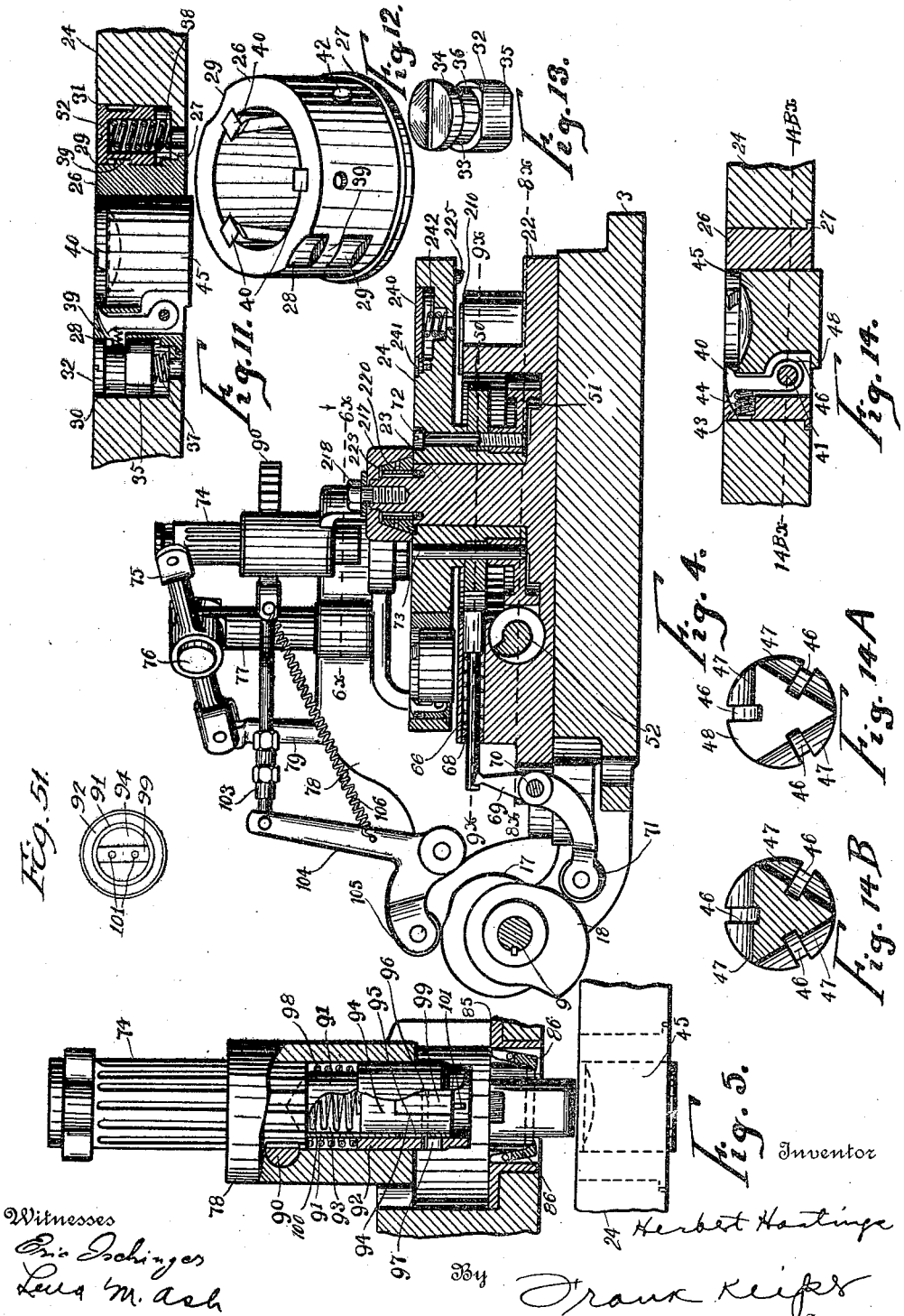

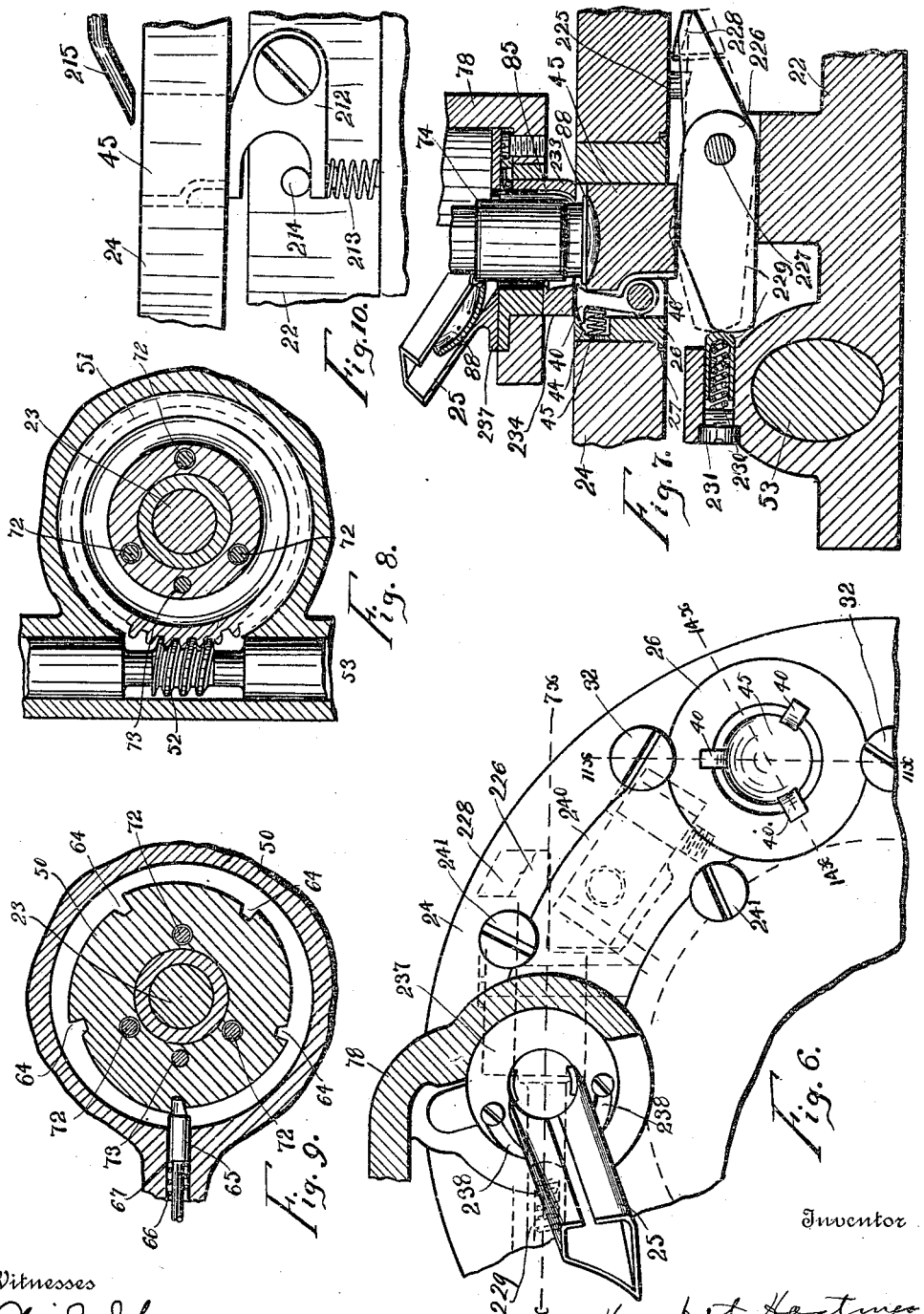

H. HASTINGS.
MACHINE FOR LOCATING AND EMBOSSING BUTTONS.
APPLICATION FILED FEB. 23, 1912.

1,272,435.

Patented July 16, 1918.
11 SHEETS—SHEET 6.

Witnesses
Inventor
Herbert Hastings
By Frank Keifer
Attorney

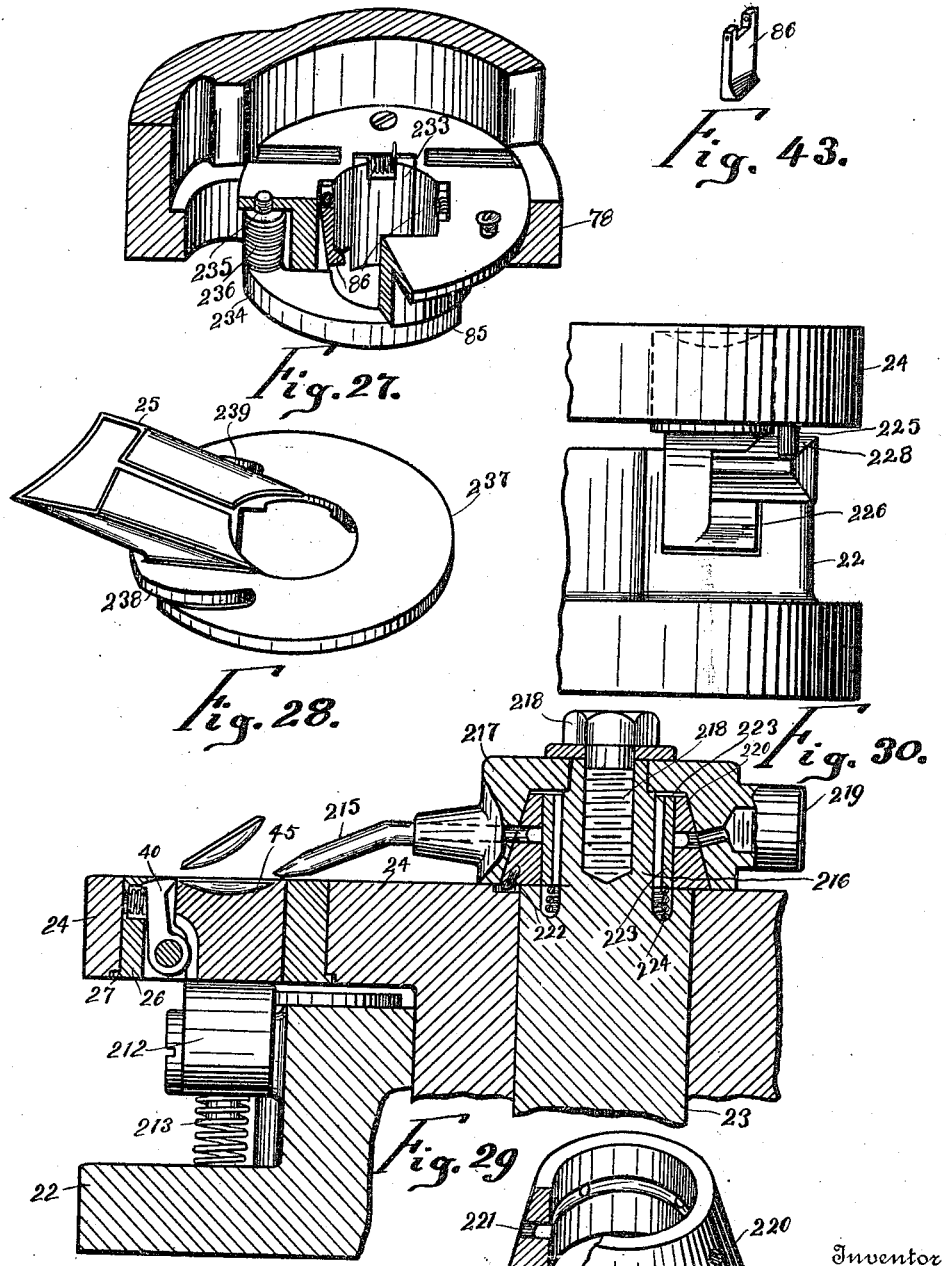

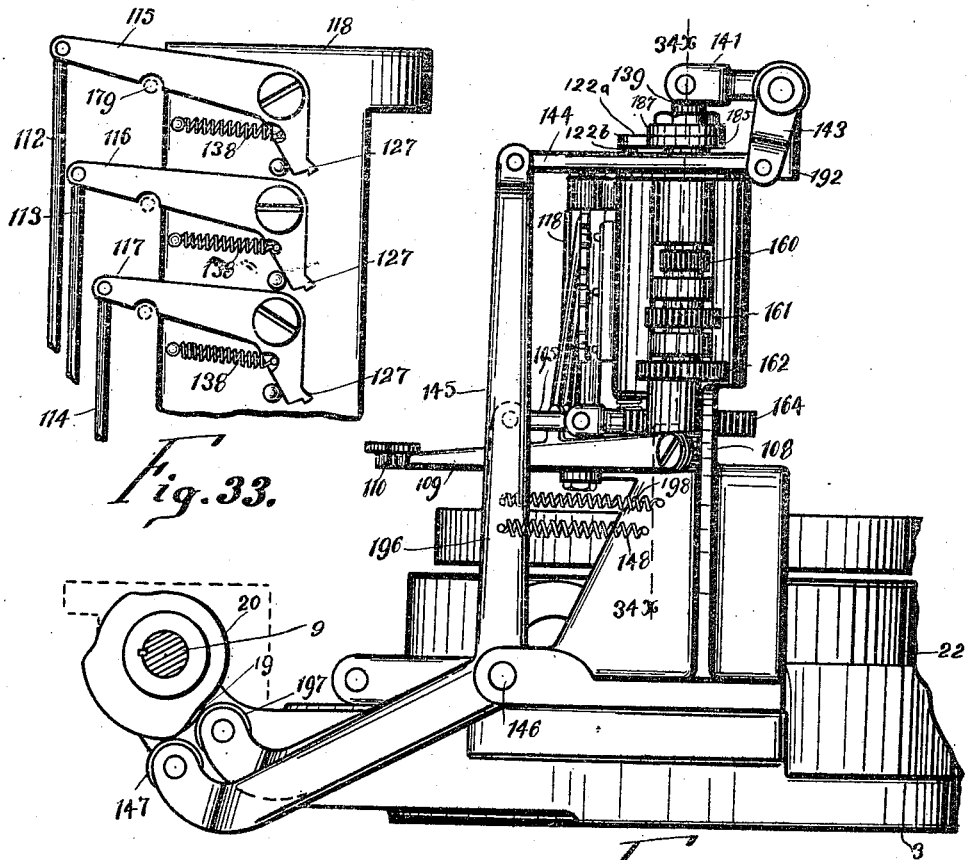

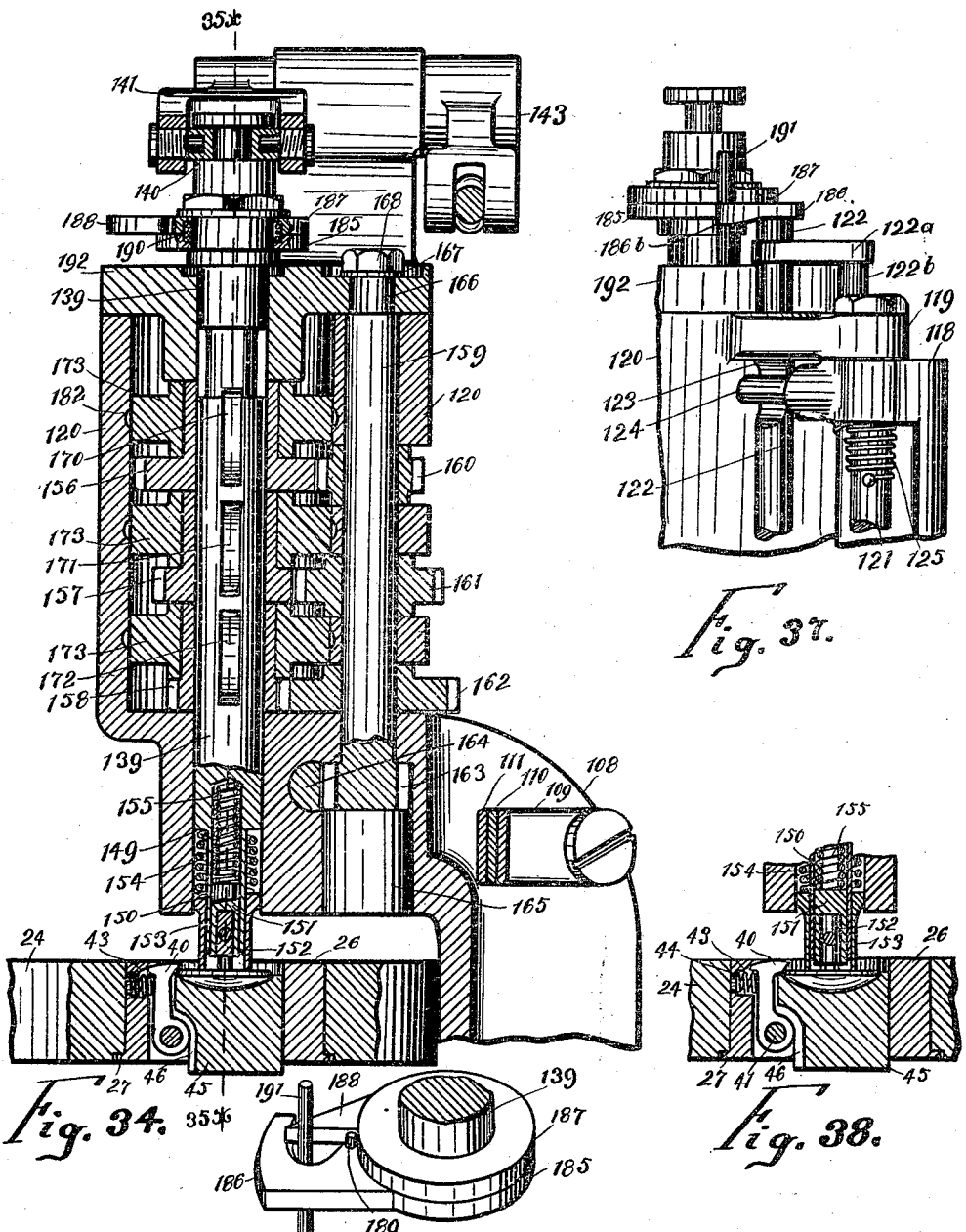

H. HASTINGS.
MACHINE FOR LOCATING AND EMBOSSING BUTTONS.
APPLICATION FILED FEB. 23, 1912.
1,272,435.
Patented July 16, 1918.
11 SHEETS—SHEET 10.
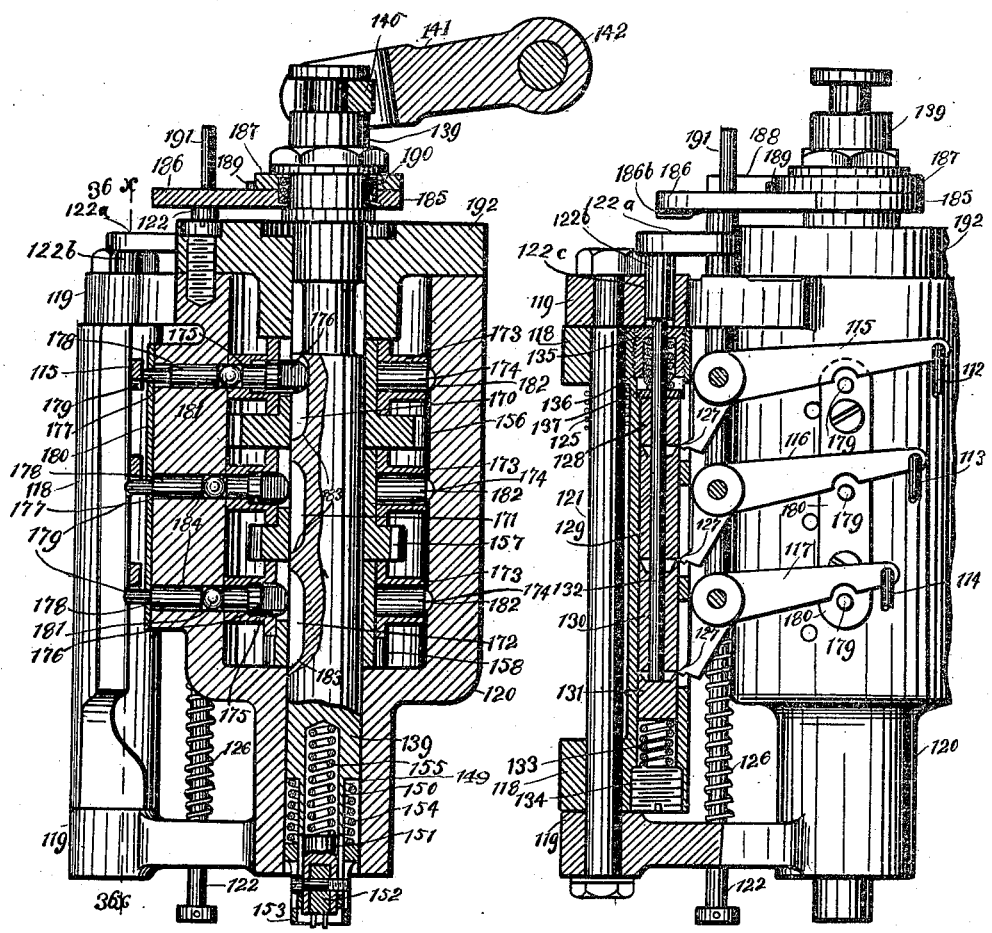
Fig. 35.
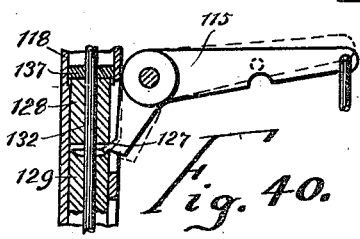
Fig. 36.
Fig. 40.

H. HASTINGS.
MACHINE FOR LOCATING AND EMBOSSING BUTTONS.
APPLICATION FILED FEB. 23, 1912.

1,272,435.

Patented July 16, 1918.
11 SHEETS—SHEET 11.

Witnesses
Eric Eschinger
Alice M. Johanne

Inventor
Herbert Hastings
By Frank Keifer
Attorney

UNITED STATES PATENT OFFICE.

HERBERT HASTINGS, OF ROCHESTER, NEW YORK, ASSIGNOR TO ART IN BUTTONS, INCORPORATED, A CORPORATION OF NEW YORK.

MACHINE FOR LOCATING AND EMBOSSING BUTTONS.

1,272,435.          Specification of Letters Patent.          Patented July 16, 1918.

Application filed February 23, 1912. Serial No. 679,520.

*To all whom it may concern:*

Be it known that I, HERBERT HASTINGS, a citizen of the United States, residing at Rochester, in the county of Monroe and State of New York, have invented certain new and useful Improvements in Machines for Locating and Embossing Buttons, of which the following is a specification.

The object of this invention is to provide a suitable machine for embossing buttons.

Another object of the invention is to provide a suitable chuck for holding the button therein while the machine is operating on the said button.

Another object of my invention is to feed the buttons into said chucks and fasten them therein.

Another object of my invention is to provide the machine with mechanism that will operate to rotate the buttons in the chucks and leave them all in uniform positions with reference to the button holes.

Another object of the invention is to expose the patterns of the buttons in the chucks to the operator so that the uniformity or lack of uniformity of the position of their patterns may be ascertained.

Another object of the invention is to provide mechanism for rotating the misplaced buttons in their chucks so that all buttons will have a uniform position with reference to their patterns.

Another object of the invention is to present the buttons properly placed to the embossing press so that the buttons will be uniformly embossed with reference to their holes and patterns.

Another object of the invention is to provide an ejector for removing the finished buttons from the machine.

Another object of the invention is to provide suitable safety devices to prevent misplaced buttons or other stock from injuring the machine.

In the accompanying drawings, Figure 1 is a plan view of the machine with the uprights of the press, of which it forms a part, shown in section and partly broken away.

Fig. 2 is a front elevation of the machine, with portions of the uprights and ram for the press shown in addition thereto.

Fig. 3 is a left side elevation of the machine showing the operation of the ram of the press, the uprights of the press being omitted.

Fig. 4 is a vertical section on the line $4^x$—$4^x$ of Fig. 1.

Fig. 5 is a section on the line $5^x$—$5^x$ of Fig. 1.

Fig. 6 is a fragmentary view of the dial plate which carries the buttons, the view being taken on the section line $6^x$—$6^x$ in Fig. 4.

Fig. 7 is a vertical sectional view of the line $7^x$—$7^x$ in Figs. 1, 2 and 6, showing the mechanism for transferring the buttons from the feeding chute to the chucks.

Figs. 8 and 9 are detail views of the mechanism for driving and locking the dial plate, Fig. 8 being located by the section line $8^x$—$8^x$ in Fig. 4 and Fig. 9 being located by the section line $9^x$—$9^x$ in Fig. 4.

Fig. 10 is a detail view of the cup lifting device which operates in connection with the ejecting mechanism.

Fig. 11 is a sectional view through the dial plate showing the chuck collar or ring, cup and lifting thimbles in position, the section being taken on the line $11^x$—$11^x$ in Fig. 6.

Fig. 12 is a perspective view of the chuck collar and gripping fingers.

Fig. 13 is a perspective view of one of the chuck lifting thimbles.

Fig. 14 is a sectional view through the dial plate, showing the chuck collar and cup, the section being located on the line $14^x$—$14^x$ in Fig. 6.

Fig. 14$^A$ is a bottom plan view of one of the cups.

Fig. 14$^B$ is a section through the cup on the line $14^{Bx}$—$14^{Bx}$ of Fig. 14.

Figure 15:
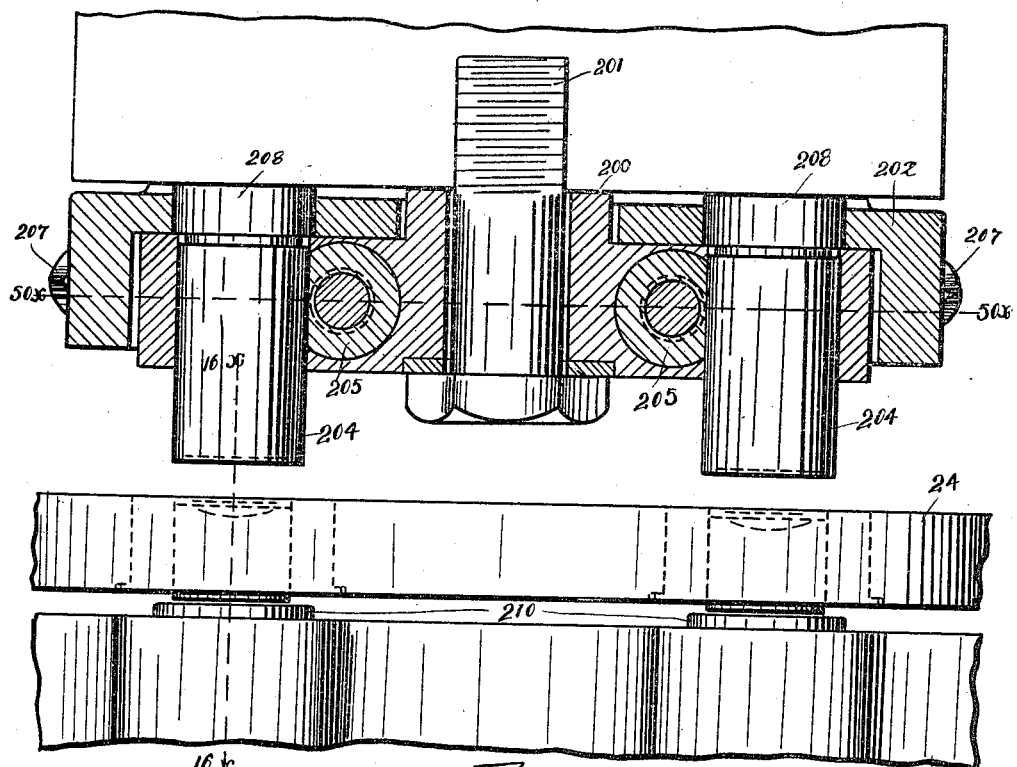

Fig. 15 is a rear elevation of the dial plate and body of the machine, partly broken away, showing also the punches and the holder for carrying them, the holder being shown in section.

Figures 16, 17:
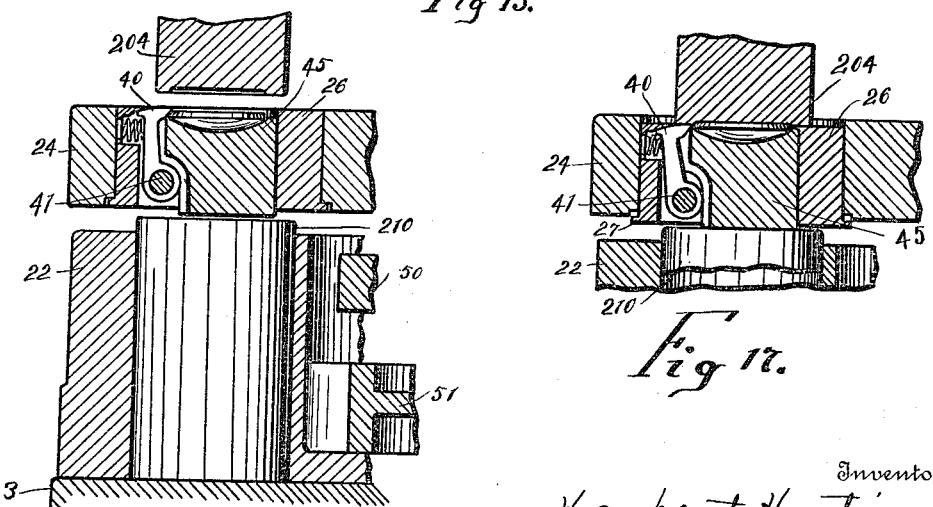

Fig. 16 is a sectional view on the line $16^x$—$16^x$ of Fig. 15.

Fig. 17 is a detail view of the parts shown in Fig. 16, the parts being shown in a different position.

Fig. 18 is a perspective view of a portion of the mechanism for rotating the dial plate.

Fig. 19 is a sectional view of the mechanism shown in Fig. 18, the section being taken on the line $19^x$—$19^x$ of Figs. 1 and 18.

Fig. 20 is a perspective view of the driving pinion which is provided with ratchet teeth on its side.

Fig. 21 is a perspective view of the ring keyed to the indexing pinion shaft, with which the pinion 20 coöperates to intermittently drive it.

Figs. 22 to 25 inclusive are plan views of the buttons in the four positions which they may assume in the feeding and locating mechanism, all of which buttons are placed by the justifying mechanism in the position shown in Fig. 25.

Fig. 26 is a plan view of the finished embossed button.

Fig. 27 is a detail perspective view of the button centering ring and the bracket that supports it, the parts being shown partly broken away.

Fig. 28 is a detail view of the delivery end of the feed chute, the parts shown separately in Figs. 27 and 28 being brought together in Fig. 7.

Fig. 29 is a vertical sectional elevation on the line $29^x$—$29^x$ in Fig. 1.

Fig. 30 is an elevation of a portion of the dial plate and the body portion of the machine, looking at the parts in the direction indicated by the arrow $30^y$ in Fig. 1.

Fig. 31 is a perspective view of the valve which controls the blast for the pneumatic ejector.

Fig. 32 is a side elevation of the justifying mechanism, looking at it from the right hand side of Fig. 1.

Fig. 33 is a detail view of the bell cranks for operating the selective plungers and the parts associated therewith.

Fig. 34 is a vertical sectional elevation on the line $34^x$—$34^x$ of Fig. 32, the shaft and justifying spindle being shown solid at the top and partly broken away at the bottom.

Fig. 35 is a vertical sectional elevation on the line $35^x$—$35^x$ of Fig. 34, the dial plate being omitted.

Fig. 36 is a vertical sectional elevation on the line $36^x$—$36^x$ of Fig. 35.

Fig. 37 is a rear view of the justifying mechanism, partly broken away, looking at it in the direction indicated by the arrows $37^y$ in Figs. 1 and 2.

Fig. 38 is a sectional elevation, partly broken away, of the justifying points, chuck collar and cup.

Fig. 39 is a perspective view of the device for retracting the justifying spindle.

Fig. 40 is a detail view of the mechanism for locking the bell crank in its depressed position and for preventing the simultaneous operation of a second bell crank.

Fig. 41 is a detail view of one of the pinions for driving the justifying spindle.

Fig. 42 is a detail view of the collar which is keyed to the hub of the pinion for driving the justifying spindle.

Fig. 43 is detail perspective view of one of the pawls 86.

Fig. 44 is a detail view of the yoke connection between the plunger and its operating lever.

Figs. 45, 46, 47, 48 and 49 are detail views of the cams 16, 17, 18, 19 and 20 respectively.

Figure 50:
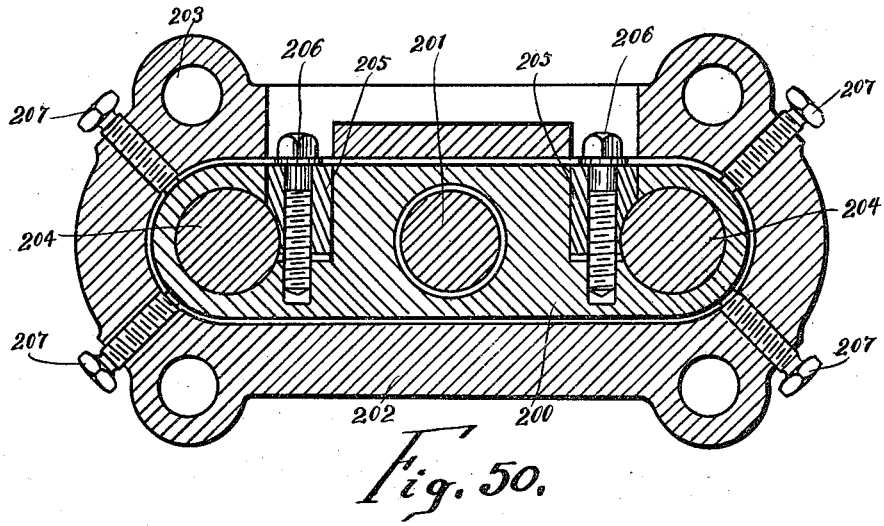
Figure 45:
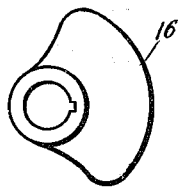
Figure 46:
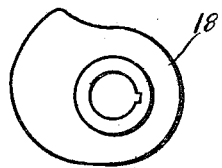
Figure 49:
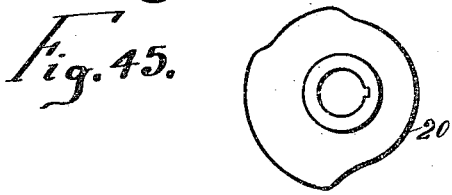
Figure 47:
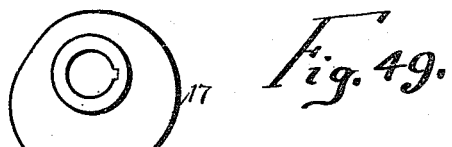
Figure 48:
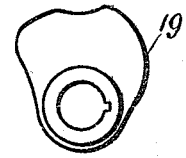

Fig. 50 is a horizontal section through the die holder and housing, taken on the line $50^x$—$50^x$ of Fig. 15.

Fig. 51 is a bottom plan view of the plunger 94 showing the pins 101.

In the accompanying drawings 1 indicates the frame of an ordinary crank press in connection with which my invention is used. This press has uprights 2, 2 on which are carried guides, and at the top of which are supported bearings of a crank shaft. A crank shaft is provided in such bearings, to which is connected a ram which is mounted to travel in the guides, and in which it is moved up and down by the rotation of the crank shaft.

To the frame of this press is rigidly fastened the universal locating and pressing fixture which operates with its mechanism on the buttons, 1st, to receive them from the feeding device and fasten them in chucks, 2nd, to locate them in the chucks with respect to the button holes, 3rd, to expose them to the inspection of the operator, 4th to justify the pattern on the button with reference to the embossing dies, and 5th, to emboss the button by presenting it to two or more embossing dies in succession, and 6th, ejecting the button from the machine.

The mechanism of the locating and pressing fixture is mounted on a plate 3 which at one side has a series of bearings 4, 5, 6, 7 and 8 integral therewith, which bearings are in line with each other and by which are supported the cam shaft 9 from which the various elements of the fixture are operated. This cam shaft carries at the left hand end the beveled gear 10 with which meshes a beveled pinion, by which the button feeding device is operated. This button feeding device is illustrated in the Patent No. 1,008,032, issued on Nov. 7, 1911, and the device illustrated and described in said patent is intended to be operated in connection with this machine. The button feeding device described in the aforesaid patent is now driven by a beveled pinion which meshes with the beveled gear 10 above described, which beveled pinion is keyed to the end of the shaft or bearing stem $C^2$, this beveled pinion being used instead of the grooved driving pulley E shown in Fig. 1 of said patent.

Keyed to the beveled gear 10 is the sprocket wheel 11, which is driven by a sprocket chain, which in turn is driven by a sprocket on the press crank. The sprocket chain which drives the sprocket wheel 11 is intended to travel over the idler 12 which is adjustably mounted on the frame of the press. The adjustment consists of a bearing disk 13 which is pierced eccentrically and is mounted on the bolt 14. By loosening the bolt 14 and nut 15 the disk 13 may be turned thereon to change the center of rotation of the idler 12. It will be understood of course that the idler 12 rotates freely around the disk 13, and that the disk 13 is adjustable eccentrically as above described.

Keyed to the shaft 9 are the five cams as follows:

Cam 16, which operates the mechanism for driving upward the locating plunger;

Cam 17, which operates the mechanism for rotating the locating plunger;

Cam 18, which operates the mechanism for intermittently locking the rotating dial plate;

Cam 19, which operates the mechanism for rotating the justifying plunger;

Cam 20, which operates the mechanism for driving upward the justifying plunger.

These various parts will presently be described.

Mounted on the stationary plate 3 is the base plate 22, which is rigidly connected thereto. Integral with this base plate 22 is the upright stem 23. The dial plate 24 has a central opening therein which receives the stem 23 and around which the dial plate is adapted to rotate, all of which parts are shown in section in Fig. 4.

The dial plate 24 carries therein a plurality of chucks which may be of any desired number, but which in the present construction is preferably limited to five. These chucks are for the purpose of receiving the buttons from the button feeding device illustrated in the Patent 1,008,032 above referred to, from which they are fed through the feed chute 25 illustrated in Fig. 7.

The construction of these chucks, which is an important feature of my invention, may be described as follows:

Mounted in the dial plate 24 are the collars or rings 26 which are held in the dial plate so as to have a slight vertical yielding movement therein, as I will now describe.

The collars 26 are provided with a flange 27 around the lower edge thereof, which engages with a corresponding recess on the lower side of the dial plate, and by which the upward motion of the collar is limited, it being understood that the collar is inserted in the dial plate from below. The collar of the chuck is suitably recessed at 28 and 29, as is illustrated in Figs. 11 and 12, these recesses occurring on the collar diametrically opposite each other. The dial plate is also suitably recessed at 30 and 31, so that between the recesses on the dial plate and the recesses in the collar 26, an opening is provided that is adapted to receive the chuck spring thimble 32. This thimble is cut from a single piece preferably, and is cylindrical in shape, having an annular recess 33 therein, on one side of which is the flat slotted head 34, by means of which it may be rotated in its seat for the purpose of locking it therein. On the other side of the recess the cylindrical part is cut away as indicated at 35 and 36.

When the collar 26 is inserted in the dial plate from below as shown in Fig. 11, and brought to position so that the recesses 28 and 29 therein coincide with the recesses 30 and 31 of the dial plate, the thimbles with the springs 37 and 38 therein may be inserted in the dial plate from above and given a quarter turn which locks both the thimble and the collar in place in the dial plate.

It will be noticed from the section illustrated in Fig. 11 and the perspective of Fig. 12, that the collar is provided with a flange 39, left therein between the recesses 28 and 29, with which the annular recess 33 of the thimble is adapted to engage, and to get the lower end of the thimble past the flange 39, the thimble itself is cut away as shown at 35 in Fig. 13.

The recess 36 is provided to hold the thimble 32 locked when it reaches the position shown in Fig. 11. When the thimble is turned so that the recess 36 is under the flange 39, the spring 37 presses the thimble up until the lower edge of the recess engages with the flange which engages with the shoulders at the ends of the recess 36 and holds it from turning. To turn the thimble it must first be pushed down against the spring until the recess 36 clears the flange 39 after which it can be turned and released from its engagement with the collar 26.

The engagement of the annular recess 33 of the thimble with the flange 39 on the collar is somewhat loose, as is illustrated in cross section in Fig. 11.

Each of the thimbles is provided with a spring which rests upon the bottom of the recess 30 or 31 which contains the thimble; in other words, the spring which presses the thimble up rests directly on an integral part of the dial plate and by the spring the thimble is pressed upwardly as far as the flanges 39 of collar 26 will permit it to go. It is obvious from an inspection of Fig. 11 that the collar 26 may be pressed down, carrying with it the thimbles on each side thereof to the limit of the compression of the springs which support the thimbles, or until the thimbles are stopped by the dial plate. This gives a limited yielding motion to the collar for the benefit of the chuck that may be carried therein.

Pivotally mounted within the collar 26 are the fingers 40, 40, by which the button is gripped. One of these fingers is shown in cross section in Fig. 14. It is mounted on a pin 41 which passes eccentrically through the collar, openings 42 being provided at suitable intervals in said collar for the reception of said pins. The collar is perforated or recessed at 43, in which recess is placed a compression spring 44 which bears against its seat in the collar on one side and against the finger 40 on the other side, which spring presses the gripping finger toward the center of the opening in the collar 26.

Mounted in the central opening of the collar 26 is the cup 45 which is recessed at suitable intervals, as indicated at 46, for the purpose of affording clearance between the lower end of the cup and the bearings for the fingers 40. The cup is inserted in place by pressing the fingers 40 back at the top and inserting the cup into the opening from above. After the cup has reached the position shown in Fig. 14, the spring pressed fingers 40 close over the top thereof and are ready to engage with and grip the button that may be placed in the cup 45. Each of the fingers 40 is provided at its upper end with a gripping edge which extends over the top of the cup and the button that may be placed therein.

The button cups are shown in Fig. 14$^A$ in bottom plan view, and in Fig. 14$^B$ in a section taken on the line 14$^{Bx}$—14$^{Bx}$ in Fig. 14, looking at it from below. The cups are cut away at 47 to provide clearance for the pins 41, so that the cup will not be obstructed thereby when it is being placed in position. Two of these pins 41, with the fingers pivoted thereon, may be placed in the collar 26 before the cup is placed in position, but the third pin must be omitted until after the collar is placed in position, because of the flange 48 on the bottom of the cup, shown in Figs. 14$^A$ and 14. After this flange has passed the line of the hole 42, the pin 41 can be inserted, limiting the motion of the cup within the ring.

It will be seen from the foregoing that the cup and the collar which carries it and in which it is free to move vertically, is permitted a slight vertical yielding movement in the dial plate, due to the compression of the springs 37, which support the thimbles 32. The parts normally stand in the position shown in Figs. 11 and 14, but when necessary the cup, collar and the two thimbles can yield by an amount equal to the clearance between the bottom of the thimbles 32 and the bottom of the recesses 30 and 31 in which they travel.

It will be noticed that the bottoms of the recesses 30 and 31 which contain the thimbles 32 and which contain the compression springs 37 and 38, are perforated with a small opening for the purpose of preventing the accumulation of dirt therein.

As above described the dial plate is provided with five chucks, together with all the parts that are accessory thereto, as has been above described. These chucks are placed on the dial plate at equal intervals apart, so that the intermittent rotation of the dial plate brings the chucks successively into coöperation with the various parts of the machine that are intended to act upon the buttons. The dial plate has rigidly fastened thereto the index locking disk 50 and the worm gear 51. The worm gear meshes with the worm 52 carried on the shaft 53, on the end of which shaft is the pinion 54, which pinion drives the shaft 53 in one direction through the clutch 55. This clutch comprises the collar 56 keyed to the shaft 53, and the ratchet teeth 57 on the pinion 54, which engage with the ratchet teeth on the collar 56 for the purpose of driving it in one direction. The pinion 54 is held up in engagement with the collar 56 by means of the compression spring 58.

The shaft 53 and its collar 56 are held against movement in the reverse direction by means of the pawl 59, which engages with a notch 60 in the collar 56, preventing reverse movement thereby. The pinion 54 is driven by the reciprocating rack 61 which travels in a bearing specially provided therefor in a bracket 62, as shown in Fig. 19. The rack is pivotally connected to the beveled gear 10, by which it is reciprocated, and as will be seen from an inspection of Fig. 3, the bracket 62 can oscillate around the shaft 53, as will be necessary during the reciprocation of the rack.

The backward movement of the rack 61, as shown in Fig. 3, causes the rotation of the shaft and causes the dial plate to advance one step through the train of mechanism above described. To stop and hold the dial plate uniformly in the successive positions, the index locking disk 50 is provided thereon. This disk is provided with five recesses 64, with which may engage a spring pressed pin or pawl 65, which bears normally against this disk, being pressed into engagement with it by the compression spring 66, which compression spring bears against the shoulder 67 of the pin at one end, and against the collar 68 at the other end, all of these parts being contained in a hole that is formed in the base 22. At the outer end the pin 65 is engaged by the rocking lever 69 pivotally mounted to rock on the pivot 70 which is mounted on the base 22. At its outer end the rocking lever carries an antifriction roller 71 that is engaged by the cam 18 keyed on the shaft 9, so that at the proper intervals the pin 65 is withdrawn, permitting the free rotation of the dial plate.

It will be seen from the above description that for each rotation of the beveled gear 10, the dial plate 24 will be turned through one-fifth of a revolution and will be locked at the end of such movement, the parts being timed to release the dial plate for further rotation before the backward movement of the rack 61 begins.

The dial plate 24, index locking disk 50 and the worm gear 51, are all fastened together by the screws 72, of which three are used, and the pin 73, as is shown in Fig. 9.

Each chuck operates in the five consecutive positions as follows:

In the first position the chuck receives the button from the feeding device through the chute 25 and the button is located therein with respect to the holes in the button.

In the second position the chuck displays the button to the operator, so that the operator can determine what change in the position of the button is necessary when the chuck reaches the third position.

In the third position of the chuck, the button in rotated on its vertical axis if necessary in the judgment of the operator, to properly position it with respect to its holes and to its coloring; in the fourth position the first embossing is impressed on the button, and in the fifth position the second embossing is impressed on the button, and while the chuck is traveling from the fifth position to the first position, the cup is raised to release the button from the gripping fingers and the pneumatic ejector operates to blow the button out of the chuck, leaving the chuck ready to receive another button, upon which the cycle of operations is repeated.

Various mechanisms by which these operations or by which the mechanical process is carried out with respect to the button, will now be described:

The feeding mechanism described in my prior Patent 1,008,032 sends the buttons down the chute 25 one at a time, so that but one button is carried in the chute at a time, the delivery of the button from the hopper being timed so that the button is delivered at the end of the chute 25 when the chuck is in its first position thereunder. When the button arrives at the bottom of the chute 25, it finds the opening at the bottom closed by the plunger 74. This plunger is operated from the cam 16 on the power shaft 9 as follows:

The upper end of the plunger is connected to the lever 75 through a sliding yoke shown in detail in Fig. 44. The lever 75 is pivoted at 76 to an upright 77 carried on the bracket 78 which is mounted on the plate 3. At its other end the lever 75 has connected thereto a link 79 which is in turn connected to the lever 80, which lever is pivotally mounted at 81 on the bracket 78, and at its free end carries an anti-friction roller 82 which is operated on by the cam 16 which rotates integrally with the power shaft 9, and by which the plunger is operated positively in one direction, viz., up, the plunger being pulled down by the tension spring 83 which is connected to the lever 80 at one end and the bracket 78 at the other end.

After the button comes in contact with the plunger 74 the plunger is lifted by the cam and the button is allowed to drop into the locating or centering ring 85, in which ring it is detained by the pawls 86 shown in Figs. 5 and 27. The chute 25 delivers the button into the ring 85 so that it lands on the pawls 86 and balances itself thereon. Both of the pawls 86 are pivotally mounted at their top and are engaged by springs which press them forward at the bottom toward the center of the centering ring of the inside of which they form a part. The pawls have projecting edges at the bottom which are beveled downward diagonally across the lower face of the pawl, conforming to the slant of the chute 25 and its continuation in the centering ring 85.

As the plunger 74 descends, it forces the button past the pawls 86 and down into the cup of the chuck as shown in Fig. 7, the button in that figure being represented by the reference numeral 88. When the button enters the cup, it finds the cup raised flush with the surface of the dial plate, this raising of the cup having previously been effected by mechanism which will be hereinafter described. In the raised position of the cup 45, the gripping fingers 40 are held back by the cup, but as the cup descends with the button therein, the gripping fingers are allowed to advance and take hold of the edge of the button and hold it securely in the cup. See Fig. 14.

After the button is landed in the cup, the rotation of the plunger takes place for the purpose of correcting the angular position of the button in the chuck with reference to its holes. The construction and operation of the plunger by which this result is secured will now be described.

The plunger 74 at the top, has the shape of an elongated pinion, the teeth of which maintain sliding engagement with the rack 90, by the endwise movement of which the pinion is rotated. The elongated pinion has a reduced end 91, solid therewith, on the outside of which is mounted to slide a sleeve 92. The reduced end 91 of the pinion 74 is bored out at 93 and a block 94 is mounted to slide therein. The sides of the reduced end are slotted as indicated at 95, and a pin or screw 96 passes through the block 94 through the slots 95 and into engagement with the slots 97 on each side of the collar 92. By reason of the slots 97 the sleeve 92 has a limited movement independent of the screw 96 and the block 94. The sleeve 92 is normally held down in the position shown in Fig. 5 by the compression spring 98, which spring can be compressed when the plunger 74 descends far enough to cause the sleeve 92 to encounter an obstruction which arrests its further movement.

The block 94 is slotted and receives therein the pin block 99 which is held in position by the screw 96. The pin block 99 is held rigidly in place by the screw 96, the dimensions of it being such as to cause it to fit snugly at the top against the top of the recess in the block 94. The width of the pin block 99 is slightly less than the width of the recess which it fills, leaving sufficient room on either side thereof to give it proper clearance from the inside of the reduced end of the plunger 74. The block 94 and the pin block 99 are held together by the screw 96 so as to move together. They are held normally in the position indicated in Fig. 5 by the compression spring 100, with the pin or screw 96 at the bottom of the slots 95 in the reduced end 91.

When the plunger 74 descends, the sleeve 92 encounters a button held by the pawls 86 and forces the button down past the pawls causing the pawls to spread and drop the button into the cup 45. The plunger continues on into engagement with the button. The sleeve 92 first encounters the rim of the button and seats itself thereon by which its further movement is arrested. The reduced end of the plunger then continues its downward movement until the pins 101 in the pin block 99 come into engagement with the button, by which the further movement of the pin block 99 and the block 94 is arrested. As the plunger 74 is rotated thereafter, the pins 101 ride around on the button which is held against rotation by the fingers 40 which grip it. The sleeve 92 rests on the button inside of the fingers 40 and does not touch the fingers 40 nor do these fingers touch the sleeve. The pins 101 continue to ride around on the button until they find the thread holes of the button, whereupon the expansion of the spring 100 will cause the blocks 94 and 99 to descend, pushing the pins into the holes of the button. The plunger 74 continues its rotation until the rack 90 reaches the end of its movement, carrying the button with the plunger, after which the cam 16 operates to raise the plunger 74 out of engagement with the button, leaving the button with its holes in a predetermined angular position.

The rack 90 and the elongated pinion on the plunger 74 are so proportioned that the regular travel of the rack will cause the plunger 74 to rotate 180 degrees. If the button on which the machine is operating is a two-hole button, it may be necessary for the machine to turn the button 180 degrees. This will be necessary if the pins 101 engage the holes of a button on the downward stroke before the turning of the button begins, in which case the button will be turned to a full half-circle. At whatever point the engagement takes place, the pins will carry the button through to the end of its movement and there leave it, thus insuring that the line passing through the two button holes will always have the same angular relation to the dial plate for all buttons in all the chucks.

The pin blocks 99 are made interchangeable so that they can be readily changed according to the type of button on which the machine may be worked. The pin block for a two-hole button will have two pins therein. The pin block for a four-hole button may have four holes therein, and the spacing apart of the pins in the pin block will depend upon the distance between the holes in the buttons, different pin blocks being made accordingly for each type of button that the machine will be expected to work upon.

The rack 90 reciprocates in a bearing 102 formed in the bearing bracket 78, which bearing bracket is bored out to receive the plunger 74 and forms the support therefor, and also carries the upright 77 which supports the lever 75. To the end of the rack 90 is pivoted the connecting rod 103, which in turn is connected to the long arm of the bell crank lever 104. This bell crank lever carries on the end of its short arm the antifriction roller 105 which engages with the cam 17, by which it is positively driven in one direction. Between the long arm of the bell crank and the rack is stretched the tension spring 106, and as the rack moves to the right in Fig. 4, this spring is stretched and as soon as the cam 17 releases the bell crank 104 the spring 106 shortens and moves the rack 90 and the bell crank 104 to the left. The length of the connecting rod 103 is adjustable by means of the screw connection indicated thereon in Fig. 4.

Thus far we have described the operation of the machine on the button in the chuck in the first position. After the button has been positioned as before described in its chuck in the first position, the machine operates to advance the chuck to the second position, in which position the button is exposed to the eye of the operator. The further operation of the machine is for bringing all the buttons with their patterns to a uniform position so that the embossing may be impressed on the button and the lines of the embossing will all have the same angular position with relation to the pattern of the button. The correct position of the button for this purpose is indicated in Fig. 25, and the finished button with the embossed lines thereon is indicated in Fig. 26, and in Figs. 22, 23 and 24 I have illustrated the button in the various positions in which it may be placed when the chuck leaves position No. 1 and from which the buttons must be turned 90, 180 or 270 degrees, to bring them to the correct position shown in Fig. 25. While the chuck containing the button is in the second position the button is exposed therein in one or the other of the four positions illustrated in Figs. 22, 23, 24 and 25, and it will then be necessary for the operator, as the exposure is made, to set the machine so that after the dial plate has been rotated to the third position, the machine will operate to turn the button in its chuck, 90, 180 or 270 degrees, or leave it undisturbed as the case may be.

If the button is a two-hole button, the button must be turned 180 degrees only or left in its original position. If the button is a three-hole button, it must be turned 120 or 240 degrees, as the case may be, the unit of angular movement in each case being equal to 360 degrees divided by the number of holes in the button. The mechanism by which this rotation of the button is secured when the chuck is in the third position, I will now describe.

Pivotally mounted on the bracket 108 are the key levers 109, 110, and 111, which levers are provided at their forward ends with key tips similar to the buttons ordinarily used on a typewriter, by which the levers can be conveniently depressed by the operator of the machine. When the button is exposed with the chuck in its second position, the operator depresses one of these three keys or none of them, as the position of the button may require. Connected to the levers 109, 110 and 111 are the links 112, 113 and 114, which in turn are connected to the long arms of the bell cranks 115, 116 and 117. These bell cranks are pivotally mounted on the swinging plate 118, which plate is mounted to swing on the lugs 119 which are integral with the casing 120 which forms part of the bracket 108. The plate 118 is connected to the lugs 119 by the pivot pin 121. The plate 118 is positively moved in one direction by the reciprocation of the cam bar 122, which bar is moved up and down by mechanism that will presently be described. This bar has the cam 123 thereon which engages with the pin 124 carried on the plate 118 and moves the plate in one direction against the torsion of the spring 125. The bar 122 is lifted by its compression spring 126 and when it is lifted, the spring 125 operates to swing the plate out.

As the plate 118 swings it carries with it the bell cranks 115, 116 and 117. These bell cranks are normally held in the position shown in Fig. 33 by the springs which are connected to the short arms of the bell cranks at one end and to the plate at the other end. The short arm of each of the bell cranks terminates in a cam 127 which engages between interlocking blocks 128, 129, 130 and 131 shown in Fig. 36. The bottom of each of the blocks is flat and slightly beveled on the edge. The top of each of the blocks except the top one is cup shaped. The blocks 128, 129 and 130 are mounted to slide on the rod 132. The bottom block is pressed upwardly by the compression spring 133 one end of which bears against the bottom block 131 and the other end of which bears against the adjusting screw 134. It will be understood that all of the interlocking blocks are carried in a sleeve that is integral with the plate 118, which sleeve is slotted to receive the short arms of the bell crank levers which project therethrough for the purpose of engaging with the ends of the interlocking blocks. The parts contained in the sleeve are inserted from either end thereof and the sleeve is closed at the lower end by the screw 134 and at the upper end by the screw 135. The screw 135 is bored out and receives therein the compression spring 136 which bears against the screw 135 at the top and against the washer 137 at the bottom. This washer 137 normally rests on a shoulder within the sleeve which limits the downward movement of the washer and positions the interlocking blocks thereunder so that the entering edge of the cam at the short end of each of the bell cranks will be normally in line with the lower end of the block which must be lifted by the bell crank when it is operated.

When any of the keys are depressed the cam at the end of the short end of the bell crank engages with the block adjacent thereto and lifts it, lifting the other blocks above it if necessary, and the washer 137 compressing the spring 136. At the same time the cam also presses down the blocks below it, compressing the spring 133 until the shoulder on the cam has passed into the cup at the top of the block, when the spring 133 expands and lifts the blocks so that the block immediately under the lever raises into engagement with the shoulder on the cam and locks the lever in engagement therewith.

The compression spring 136 is stronger than the spring 133 and therefore holds the washer 137 seated on its shoulder, below which it cannot pass, and the spring 133 forces the blocks up against the washer, which prevents them from going higher, holding the joints between the blocks opposite the tips of the cams on the short arms of the bell crank levers.

The interlocking blocks prevent the operation of more than one key at a time and after a key has been depressed the blocks hold the lever which has been operated in its operated position, the operated position being shown in full lines in Fig. 40 and the unoperated position being shown in dotted lines. The levers are released by depressing the rod 132 which compresses the spring 133 and permits the interlocking blocks to drop by gravity away from the shoulder on the bell crank from below, and the block above, which has been raised by the operation of the lever to compress the spring 136, will be forced down by the expansion of the spring and will tend to force the bell crank back to its reset position. When the bell cranks are locked in operated position, the spring 138 attached thereto, as shown in Fig. 33, is stretched, and as soon as the bell crank is released the contraction of the spring pulls the bell crank back to normal position. In this way the parts are reset for a second operation. The mechanism by which the bar 132 is operated will presently be described.

Mounted to slide in the casing is the plunger 139, by which the rotation of the button is secured. This plunger has connected thereto at the top a yoke 140 by which it can be raised and lowered, which yoke permits the free rotation of the plunger. This yoke is connected in turn to the lever 141 which is keyed to the shaft 142, to which in turn is keyed the lever 143, to which in turn is connected the link 144. To this link is pivotally connected the long arm of the bell crank lever 145, which bell crank is pivoted to lugs at 146 which are integral with the brackets 108. The short arm of the bell crank 145 carries thereon the anti-friction roller 147 which engages with the cam 20, by which the several parts are operated to lift the plunger 139. As the anti-friction roller 147 is moved down, the bell crank rocks and stretches the tension spring 148 which is connected to the bell crank at one end and the bracket 108 at the other end. The contraction of this spring forces the plunger 139 down into engagement with the button. See Fig. 32.

The plunger 139 at its lower end has a shoulder 149 and a reduced end 150. This reduced end is bored out and carries therein the block 151, which block is in turn recessed and contains the pin block 152. Outside of the reduced end is carried the sleeve 153 which is pressed down by the compression spring 154 which is compressed between the shoulder 149 at one end and the top of the sleeve at the other end. The reduced end of the plunger is slotted, as is also the sleeve 153, and through the block 151 and through the slot in the reduced end 150 and the slot in the sleeve 153, extends a pin by which the several parts are held together. When the plunger descends the sleeve 153 first comes into contact with the button in the chuck and its further movement is arrested thereby. The plunger however continues to descend, compressing the spring 154 until the block 152 with its pins comes into contact with the button. The pins in the block 152 will ordinarily find the holes in the button at once, but if they do not the further movement of the block will be arrested by the button and the plunger can continue to descend, compressing the spring 155.

The parts above described which are carried at the bottom of the plunger 139, are substantially the same in construction and manner of operation as the corresponding parts at the bottom of the plunger 74 above described. See Figs. 5 and 34.

After the engagement between the plunger and the button is secured the rotation of the plunger through 90, 180 or 270 degrees occurs. After the rotation of the plunger is finished it moves up out of contact with the button and then rotates back to its starting point. The plunger or any given point thereon is thus moved through a path having four sides from the starting point back to the starting point and this movement may be referred to as a four way movement. The parts by which this rotation is secured will be described as follows:

Surrounding the plunger are the gear wheels or pinions 156, 157 and 158, which gear wheels are mounted to rotate normally freely around the plunger. Mounted in the casing parallel to the plunger is the oscillating shaft 159, which shaft has keyed thereon pinions 160, 161 and 162. The pinion 160 meshes continually with the pinion 156. The pinion 161 meshes continually with the pinion 157. The pinion 162 meshes continually with the pinion 158. The shaft 159 carries at its bottom a pinion 163 keyed thereto or integral therewith, which pinion meshes with the rack 164, by the reciprocation of which rack the shaft and the pinions thereon are oscillated, as are also the pinions on the plunger 139. The shaft 159 has the enlarged end 165 which engages with and rotates in a suitable bearing formed in the bracket 108. The shaft 159 has a shoulder and reduced end 166 at the top, the reduced end extending through a suitable opening in the casing at the top. The shaft 159 is held in place at the top by the washer 167 and the nut 168 which engages with the threaded end of the shaft 159.

The pinions 160 and 156 are so proportioned that a revolution of the shaft 159 through 180 degrees will cause the pinion 156 to revolve through ninety degrees. A rotation of the shaft 159 through 180 degrees will drive the pinion 157 through 180 degrees by reason of its engagement with the pinion 161. A rotation of the shaft 159 through 180 degrees will drive the pinion 158 through 270 degrees by reason of its engagement with the pinion 162, and the three pairs of pinions are proportioned as to their pitch and the number of teeth thereon so as to secure this result. The rack 164 is reciprocated far enough to cause the shaft 159 and the pinions keyed thereto to oscillate through 180 degrees, and while so oscillating the pinion 156 on the plunger 139 oscillates through 90 degrees, the pinion 157 oscillates through 180 degrees, and the pinion 158 oscillates through 270 degrees. This arrangement of pinions adapts itself properly to buttons as shown having two and four holes therein, and a different arrangement of pinions would be necessary if buttons having a different arrangement of holes were to be operated upon by the machine, as will be readily apparent.

The pinions 156, 157 and 158 oscillate freely on the plunger 139. The plunger does not partake of the oscillation of the pinions unless specially coupled thereto. The pinions can be coupled to the plunger 139 so as to cause it to rotate through 90, 180 or 270 degrees, by mechanism which I will now describe.

The plunger 139 is provided with three key-ways 170, 171 and 172. Each of the pinions has a collar integral therewith that surrounds the plunger 139. On each of these collars a ring 173 is fastened rigid therewith. This ring is pierced diametrically with a cylindrical opening 174 having a reduced opening 175. Mounted to slide in this cylindrical opening 174 is the key 176. This key has a reduced end which fits in the reduced end 175 of the cylindrical opening, and it also has a shoulder which engages with the shoulder in the cylindrical opening, which limits its movement away from the center of rotation as is illustrated in Fig. 35. The parts are so arranged that the end of the key normally stands flush with the periphery of the ring 173 and the inner surface of the collar of the pinion on which the ring is mounted. Through the casing is placed a cylindrical opening 177, in which is mounted to slide the pin 178, having the reduced end 179. The shoulder at the base of the reduced end engages with a plate 180 through which the reduced end extends, by which it is held from coming out of place. Between the pin 178 and the key 176 a ball 181 is placed having a radius somewhat less than the travel of the pin and key. This ball normally rests entirely in the cylindrical hole in the casing. When the pin 178 is moved forward it pushes the ball into the reduced end 175 of the cylindrical opening 174 and pushes the key 176 into engagement with the key-way 170, causing the ring 173 to carry the plunger 139 with it in its rotation. The portion of the ball 181 which projects outside of the cylindrical opening 175 would lock the ring against rotation except for the fact that the casing 120 is cut away with the annular grooves 182 which serve as races for the balls 181 as they are carried around by the rings. The ball holds the key forward in engagement with the key-way of the plunger 139 during the oscillation of the ring and plunger. When the plunger 139 rises after it has finished its oscillation, the cams 183 at the bottom of the key-ways operate to push out the key, ball and pin to their normal position. The plunger 139 is raised by the cam 20 through two successive steps. The first step disengages the plunger from the button so that the button is left advanced 90, 180 or 270 degrees, as the case may be. At the end of the first step the plunger is rotated backward to its starting point and is then raised to its initial position. If the plunger were completely raised in one step before the angular movement had been completed, the cams could not operate to force out the key and the ball because they had not yet been placed in line with the opening 184 in the casing. The cam 20 is shaped accordingly so as to arrest the upward movement of the plunger 139 midway and hold it there until the spring 198 has operated on the rack 164 to oscillate the plunger in the backward direction.

It will be understood of course that but one of the sets of gears can be keyed to the plunger at a time. Otherwise the operation of the machine would be entirely prevented or some of the parts would be broken. Hence the need for the interlock between the levers 115, 116 and 117.

The keys 176 are thrown into engagement with the plunger to cause the rotation thereof, by the operation of the levers 109, 110 and 111, as will now be described.

When the lever 109 is operated it carries with it the link 112 and the bell crank 115. This bell crank is carried down past the pin 179 which projects through the casing. The plate 118 is then rocked, carrying the lever 115 sidewise against the pin 179, driving the pin 179, ball 181 and key 176 inward, so as to lock the ring which carries the key 176 to the plunger 139, so that the rotation of the pinion 156 and the ring 173 fastened thereto will cause the rotation of the plunger as well. This rotation does not begin until the plunger has fully descended into engagement with the button. As soon as the plunger has completed its rotation in one direction, the cam 20 operates to raise the plunger half way and hold it there while the backward rotation is completed, after which the plunger is raised the balance of the distance and positively ejects the key.

Carried near the top of the plunger and integral therewith is the plate 185 having the cam projection 186 integral therewith. This plate 185 is keyed to the plunger 139 and moves up and down and rotates therewith. Loosely mounted on the plunger 139 is the plate 187 having the projection 188 thereon. The cam projection 186 carries the pin 189, which pin extends in the path of movement of the projection 188 and limits the travel of the plate 187 with respect to the plate 185. This pin 189 is useful especially when the plunger carrying the plates 185 and 187 is removed from the machine, as it prevents the unwinding of the spring 190, by which the plunger is held in its normal position after the oscillation of it forward and back has been completed; that is, with the key-ways 170, 171 and 172 held in line with the keys that are adapted to be engaged therewith. The pin 191 is provided in the cover plate 192 of the casing and it is against this pin that the cam projection of the plate 185 is held by the torsion of the spring 190. One end of the spring is connected to the plate 185 and the other end of the spring is connected to the plate 187, so that the projection 188 of the plate 187 is held by the spring against the pin 191 on one side and the cam projection of the plate 185 is held by the spring against the pin 191 on the other side. The projection 188 normally does not bear against the pin 189 and only engages with it when the plunger is removed from the machine.

After the plunger 139 has descended about ¼ of an inch, the cam projection 186 engages with the bar 122 and carries the bar down with it, which bar is provided with the cam 123, by which the plate 118 is swung in as the bar descends. If a lever has been depressed the swinging of the plate sidewise will carry the bell crank lever 115, 116 or 117 connected thereto against its pin 179, causing the key 176 to be thrown into the key-way 170, 171 or 172 of the plunger, causing the plunger to oscillate with the gear and collar with which the key is carried. The plate 118 is swung inwardly after the downward operation of the plunger 139 has begun, and the plate is released to be swung outwardly again as soon as the plunger has rotated far enough to take the cam projection 186 away from above the bar 122. If neither of the levers 115, 116 or 117 has been operated, the plunger 139 will not oscillate, and the cam projection 186 will not uncover the bar 122, in which case the bar 122 can only rise when the plunger rises. If however, one of the levers has been operated the plunger 139 will oscillate and the cam projection 186 will swing sidewise and uncover the bar 122 before the plunger begins to rise, permitting the bar 122 to rise at once. In either case the bar 122 is pushed up by the expansion of the spring 126 thereon. In the one case however it rises with the plunger slowly if no key has been operated, and in the other case it rises with a snap if a key has been operated. The parts are proportioned so that the rod 122 will be uncovered after the plunger has rotated about thirty degrees, so that in the one case where a lever has been operated, the plunger will rise earlier and faster than it will if no key has been operated. If the plunger oscillates at all it will be through 90, 180 or 270 degrees, so that in any case the rod 122 will be uncovered, if at all, very shortly after the oscillation of the plunger has begun.

On the bar 122 is carried the plate 122ª, from which depends a pin 122ᵇ, which pin works in a socket 122ᶜ in the cover plate 192. The pin 122ᵇ is intended to operate on the bar 132 for the purpose of unlocking the lever 115, 116 or 117 which may have been operated for the purpose of releasing such lever and permitting the resetting of it. A downward movement of this bar 132 through about a sixteenth of an inch is sufficient to accomplish the purpose. This movement is communicated to the bar as follows:

The plunger 139 reciprocates vertically about nine-sixteenths of an inch. The bar 122 reciprocates vertically about five-sixteenths of an inch. The plunger 139 moves through about four-sixteenths of an inch before the cam projection 186 on the plunger 139 encounters the bar 122 and begins to carry it with it. The pin 122ᵇ moves up and down with the bar 122 idly without having any effect on the bar 132, but when the cam projection 186 swings sidewise the cam 186ᵇ on the end of the cam projection 186 engages with the bar 122 and depresses it about a sixteenth of an inch additional before it lets go of it. This additional movement of a sixteenth of an inch is communicated to the bar 132 which pushes down the lowest interlocking block 131 and permits the interlocking block that is engaged with the bell crank lever 115, 116 or 117 to drop out of engagement therewith, upon which the spring connected to said bell crank operates to restore it. The levers 115, 116 and 117 cannot be operated while the plate 118 remains swung in, for the reason that said levers will then encounter the pins 179 in their downwaward movement, and as the pins cannot yield sidewise the levers are locked against such downward movement. After the plate 118 has been swung out, the levers are ready for another operation and as has been above explained, the parts are reset ready for another operation a little earlier if the plunger 139 is oscillating than if it is not oscillating. In any event, the levers can be operated after the first five-sixteenths of an inch of the upward movement of the plunger 139 has been completed, and this must be completed before the dial plate can begin to turn to carry the chuck and its button from the second position to the third position.

When the button has been exposed in the second position, and after the operating levers have been released as above explained, the operator of the machine can operate one of the levers 115, 116 or 117 and cause the plunger 139 to twist said button in its chuck 90, 180 or 270 degrees after it has come into engagement therewith, and then withdraw from said button, leaving it in such changed position. If none of the levers 115, 116 or 117 are operated, then the plunger will descend and engage with the button and will recede again without changing its angular position.

As above described, the shaft 159 carries the pinion 163, which is oscillated by the rack 164 illustrated in Figs. 32 and 34. This rack is mounted to travel in suitable guides in the bracket 108 and has connected to the end thereof a connecting rod 195, which connecting rod is connected to an arm of the bell crank lever 196 which is pivoted at 146, the other end of which carries an anti-friction roller 197, through which the rack is positively driven in one direction by the cam 19 on the shaft 9. The rack is driven in the other direction by the tension spring 198 shown in Fig. 1.

The cam 19 is so shaped as to leave the rack 164 and pinions operated thereby idle for a considerable period of time. The cam is placed so that the rotation of the pinions does not begin until after the plunger 139 has descended and engaged with the button, by which time the plate 118 has been swung to cause the engagement of the key of the selected gear with the plunger to cause its rotation.

After the foregoing operations on the chuck in its third position have been completed, the dial plate is advanced to the fourth position to bring the chuck and its button immediately under the first die plunger that is intended to operate on the button for the purpose of embossing the button. This plunger has engraved on the bottom thereof a series of negative lines such as are illustrated positively in Fig. 26, and by subjecting the button to this plunger under pressure the soft material of the button yields and becomes permanently set with impressions and ridges corresponding to the ridges and impressions on the plunger. In order to support the button when it is exposed to the pressure of the plunger, the cup in which the plunger is carried must itself be backed up by a local support independent of the dial plate. The plungers are attached on the ram of the press by an adjustable die holder 200, which is fastened to the ram by the bolt 201. Surrounding the adjustable die holder is the housing 202, which housing is attached to the ram of the press by bolts passing through the eyes 203, shown in Fig. 1. In the die block 200 are carried the die plungers 204, 204. These plungers are fastened rigidly in the die block 200 by means of the bushings 205 between which and the die block the die plungers are pinched. The bushing is forced into place by the screw 206 which has a threaded engagement with the die block 200. The die block 200 is adjustable laterally and axially and is clamped in place by the set screws 207. As illustrated in Fig. 15, a clearance is provided between the bolt 201 and the die block 200, and a clearance is also provided between the die block 200 and the housing 202. The bolt 201 and the housing 202 are not movable laterally with reference to the ram or with reference to each other, while the die block 200 is capable of lateral and angular movement with reference to the ram, the bolt 201 and the housing 202. To fill in the interval between the dies 204 and the bottom surface of the ram, I provide the die anvils 208, which anvils are slightly larger in diameter than the holes in the die block 200, so that they cannot fall through when the die is removed. For the purpose of shortening up the die 204 the anvil 208 is provided with a reduced end which extends down into the hole which carries the die 204. The reduced end should have as much clearance with the sides of the hole with which it engages as the die block 200 has with the bolt 201 and the housing 202. When the parts have been assembled as is illustrated in Fig. 15, the dies and anvil blocks press directly against the ram of the press, so that the dies have a rigid backing by which they are forced into the soft material of the buttons.

Below the dial plate 24 is the plate 22 which carries the anvil blocks 210, which are located in line with the dies 204 and on which the chuck, comprising the cup 45 and the ring 26, seats when the plunger descends. As will be seen from an inspection of Fig. 17, the die 204 makes contact with the ring 26 and carries it down with it, and also carries with it the fingers 40 pivoted thereon. The gripping edges of these fingers ride down and out along the upper edge of the button in the cup 45, exposing the whole of the top of the button to the embossing surface of the punch, but continue to grip the button on its edge to hold it in the cup against the upward drag of the embossing die when the die rises and also prevents any displacement of the button in the cup. When the punch recedes the ring 26 rises again and the fingers 40 rise with the button or over the button according to the shape of its edge. The gripping edges of the fingers 40 do not at any time quite leave the edge of the button.

After the operation on the button in the fourth position of the chuck has been completed, the dial plate 24 advances and carries the chuck to the fifth position, where the operation of the embossing die is repeated, substantially the same as in the fourth position, two embossing dies 204 being used which are substantially alike. After the embossing operation on the button is completed, the dial plate again advances and carries the chuck to its first position.

In passing from the fifth position to the first the button is ejected from the machine by mechanism which I will now describe.

Mounted in the base plate is the pawl 212 which is raised up by the compression spring 213. The bottom arm of the pawl bears against the pin 214, by which its upward movement is arrested with the top of the pawl held just below the dial plate and out of contact therewith. As the dial plate rotates the cups 45 normally extend below the dial plate, and as the cups pass over the pawl 212 they are lifted thereby so that the top of the cup is carried flush with the top of the dial plate, in which position the gripping fingers 40 are withdrawn, as has been above described. When the cup is passing above the pawl 212, the button therein is passing under the nozzle 215 which at that instant delivers a blast of air against the button in such manner as to blow it out of the cup, as is illustrated in Fig. 29. This air blast is timed to occur only when the button is adjacent to the nozzle in the following manner:

The dial plate is mounted to rotate around the central spindle 23, which spindle has the stepped end 216 on which is carried the housing 217 which is clamped thereto by the screw 218. This housing carries the nozzle 215 on one side thereof, and on the other side is perforated and threaded as shown at 219, for the purpose of receiving a pipe connection with an air compresser. Mounted to rotate inside of the housing is the valve 220 having five perforations equally spaced around the periphery thereof, which perforations are connected by the annular groove 221. These holes in a machine having five chucks therein would be 72 degrees apart between centers, and as the valve rotates with the dial plate one of the holes therein registers with the opening at 219 on one side and with the opening in the nozzle 215 on the other side, so that a blast of air passes through the hole in the valve on the one side and around the annular groove 221 in the valve and out through the hole on the other side, through the nozzle and against the button at the instant the button passes the nozzle after its cup leaves the fifth position. The valve is connected to the dial plate to rotate therewith, by means of the pin 222. Inside of the valve 220 is forced the collar 223, making an air tight fit therewith, the parts being forced together so that air will flow through the annular groove without leaking. The spindle 23 has an annular groove therein in which is seated a spring 224, which by its expansion forces the valve against the cone seat in the housing 217, thus preventing the leakage of air on the rotation of the valve therein.

After the button is ejected the dial plate 24 continues to rotate and carries the cup 45 away from the pawl 212. After passing it the cup 45 again can drop. To raise the cup and withdraw the fingers 40, just before the cup reaches the first position again, I provide the following mechanism:

Below the dial plate and integral therewith I place the pin 225, one for each cup. Mounted on the base 22 is the pawl 226, pivoted at 227, and this pawl carries the cam 228 thereon, which cam rides under the pin 225 and is depressed thereby, causing the forward end of the pawl 226 to rise. The forward end of the pawl is rounded. Mounted to bear against the forward end of the pawl 226 is the spring pressed thimble 229 which is pressed against the pawl by the compression spring 230, the compression of which is regulated by the screw 231, all of these parts being carried in a suitable recess in the base 22. The thimble 229 and the pawl 226 are each slightly rounded on the meeting ends. When the pin 225 depresses the pawl 226 at one end and raises it at the other, it forces the thimble 229 into its socket against the compression of the spring 230 and after the round end of the pawl 226 passes over its center with the thimble, the spring expands and presses the thimble out and holds the pawl in a raised position. The cup 45 as it approaches the first position, finds the pawl 226 being raised, so that the cup 45 is carried up therewith and the fingers 40 are withdrawn. When however, the plunger 74 descends with the button, the cup 45 is pressed down, the cup in turn pressing down the pawl 226 to its lowest position, passing over the center of the thimble 229, after which the cycle of operation is repeated as above described.

As above described, the locating and centering ring 85 is provided with the detaining pawls 86 arranged diametrically opposite each other, which pawls are pivotally mounted and are pressed toward the center at the bottom by torsion springs. Between these pawls on the advancing side of the dial plate is pivotally mounted a button centering pawl 233 which is pressed back from the center at the bottom by torsion springs. This pawl is yieldingly mounted so that in case a button is carried around by the chuck, that has not been properly ejected by the pneumatic blast, or any foreign substance becomes caught in the chuck and is forced against the pawl, the pawl can yield toward the center of the centering ring and away from the dial plate and allow it to pass without injury to the machine. On the other side of the centering ring is provided the centering pawl 234 which is pivoted at 235 and is pressed by the torsion spring 236 toward the center of the locating and centering ring, this pawl being diametrically opposite the centering pawl 233. This pawl can also yield in the direction of the rotation of the dial plate, so that any substance that is out of place in the chuck can press the pawl back on the rotation of the dial plate, and be carried on without causing injury to the machine. The pawl 233 lines up with the cylindrical surface of the locating and centering ring, of which it forms practically a continuous part. The pawl 234 has its inner surface concentric with the locating and centering ring 85, but is beveled or cone shaped so as the better to guide the button when passing through the locating and centering ring 85 to the cup 45.

The chute 25 terminates in a disk or plate 237 which is provided with the curved slots 238, 239, each of which slots is concentric with the inner end of the other slot. These slots are engaged by screws carried in the top of the locating and centering ring, all of the parts of which are contained in the bracket 78.

To guard against the possibility of accidental injury to the machine, that portion of the dial plate which is between the chucks and is in line with the die plungers, is made yielding. For this purpose the plates 240 are provided between the chucks, which plates are segments of a ring, and which plates are held in place by the flat headed screws 241. The plates 240 and the dial plate 24 are recessed so that the surface of the dial plate and the surface of the plate 240 and tops of the screws 241 all lie in the same plane when the parts are assembled.

The dial plate is grooved under the plates 240 so as to afford clearance between said plates and the bottom of said grooves. Mounted in said grooves are the compression springs 242 which press the plates 240 up against the screws 241. The plates 240 can yield to the extent that the springs 242 can be compressed, so that the dial plate at points intermediate of the chucks cannot be subjected to any strain that will cause injury to the machine.

It will be noticed that there are two plungers in the machine, 74 and 139, that are in many respects constructed and operated substantially alike. Both of these plungers are raised by cams and depressed by springs. In their rotation the plunger 74 is moved forward by the cam 17 and back by the spring 106 while the plunger 139 is moved forward by the spring 198 and back by the cam 19. It is obvious that the mechanical elements by which these plungers are operated may be varied within wide limits without departing from the spirit of my invention within the scope of the claims.

Having thus described my invention, what I claim as new and patentable is as follows:

1. In a machine for working on buttons, the combination of a rotating dial plate, means for receiving and holding buttons thereon, means for feeding buttons thereto, means for rotating buttons therein, means for embossing the buttons that may be carried thereon, and means for ejecting the buttons therefrom.

2. In a machine for working on buttons, the combination of an intermittently rotating dial plate, chucks positioned in said dial plate, a feeding mechanism for delivering the buttons to said chucks, mechanism engaging with the holes of the buttons to position the buttons in said chucks.

3. In a machine for working on buttons, the combination of a dial plate, chucks mounted therein, a feeding mechanism for delivering buttons to said chucks, means for intermittently rotating said dial plate to carry each chuck away from said feeding mechanism after a button has been fed thereto, each of said chucks having a limited axial motion and being provided with means for gripping the edge of the button.

4. In a machine for working on buttons, the combination of a dial plate, chucks mounted therein, a feeding mechanism for delivering buttons to said chucks, means for intermittently rotating said dial plate to carry each chuck away from said feeding mechanism after a button has been fed thereto, means operating in connection with said feeding mechanism for changing the angular position of the button in the chuck.

5. In a machine for working on buttons, the combination of a dial plate, chucks mounted therein, a feeding mechanism for delivering buttons to said chucks, means for intermittently rotating said dial plate to carry each chuck away from said feeding mechanism after a button has been fed thereto, means operating in connection with said feeding mechanism for changing the angular position of the button in the chuck, means operating independent of said feeding mechanism, again changing the angular position of each button in its chuck.

6. In a machine for working on buttons, the combination of a dial plate having chucks thereon, feeding mechanism operating to deliver a button into each of said chucks, mechanism for changing the angular position of the button in its chuck, operating independently of the feeding mechanism, each chuck being advanced from the feeding mechanism to the second named mechanism by the rotation of the dial plate.

7. In a machine for working on buttons, the combination of a dial plate having chucks thereon, feeding mechanism operating to deliver a button into each of said chucks, mechanism for changing the angular position of the button in its chuck, operating independently of the feeding mechanism, each chuck being advanced from the feeding mechanism to the second named mechanism by the intermittent rotation of the dial plate through a plurality of successive steps.

8. In a machine for working on buttons, the combination of a rotating dial plate, chucks thereon capable of receiving buttons, means positioned over the line of travel of said chucks for rotating in contact with said buttons without moving said buttons, and then engaging with said buttons to carry said buttons along to the end of the rotation of said means.

9. In a machine for working on buttons, the combination of a rotating dial plate, chucks thereon capable of receiving buttons, means positioned over the line of travel of said chucks for rotating in contact with said buttons without moving said buttons, and then engaging with said buttons to carry said buttons along to the end of the rotation of said means, said means being then withdrawn leaving said button in a predetermined position.

10. In a machine for working on buttons, the combination of a dial plate having chucks thereon, buttons having symmetrical recesses therein, rotating means bearing against said buttons and rotating in contact therewith, first without disturbing the position of the buttons, then passing into engagement with the recesses in said buttons and carrying said buttons therewith to the end of the rotation of said means.

11. In a machine for working on buttons, the combination of a dial plate having chucks thereon, buttons having symmetrical recesses therein, rotating means bearing against said buttons and rotating in contact therewith, first without disturbing the position of the buttons, then passing into engagement with the recesses in said buttons and carrying said buttons therewith to the end of the rotation of said means, said means being withdrawn leaving said buttons in a predetermined uniform position.

12. In a machine for working on buttons, the combination of a dial plate having button chucks therein, means for feeding buttons to said chucks in turn as the dial rotates, means coacting with the holes in said buttons for justifying the position of said buttons in said chucks, means for embossing said buttons after they have been justified.

13. In a machine for working on buttons, the combination of a dial plate having button chucks therein, means for feeding buttons to said chucks in turn as the dial rotates, justifying mechanism for rotating the buttons within the chuck to uniform positions, means for embossing said buttons while they are supported by said chucks.

14. In a machine for working on buttons, the combination of a frame and a dial plate rotating therein, chucks mounted in said dial plate, feeding mechanism mounted on said frame for feeding a button into each of said chucks as said chucks are successively presented to said feeding mechanism by the rotation of the dial plate, a plunger coöperating with said feeding mechanism to seat the button in said chuck, means for rotating said plunger in contact with said buttons to adjust the angular position of the holes of the button in said chuck.

15. In a machine for working on buttons, the combination of a frame and a dial plate rotating therein, chucks mounted in said dial plate, feeding mechanism mounted on said frame for feeding a button into each of said chucks as said chucks are successively presented to said feeding mechanism by the rotation of the dial plate, a plunger coöperating with said feeding mechanism to seat the button in said chuck, means for rotating said plunger in contact with said button to adjust the angular position of the holes of the button in said chuck, means for advancing said dial plate to carry said button into engagement with a second rotating plunger, by which the angular position of said button in said chuck may be further changed.

16. In a machine for working on buttons, the combination of a frame and a dial plate rotating therein, chucks mounted in said dial plate, feeding mechanism mounted on said frame for feeding a button into each of said chucks as said chucks are successively presented to said feeding mechanism by the rotation of the dial plate, a plunger coöperating with said feeding mechanism to seat the button in said chuck, means for rotating said plunger in contact with said button to adjust the angular position of the holes of the button in said chuck, means for advancing said dial plate to carry said button into engagement with a second rotating plunger, by which the angular position of said button in said chuck may be further changed, said second rotating plunger being capable of rotating said button through one of a plurality of angles.

17. The combination in a machine for working on buttons, of a chuck, a button engaging plunger capable of advancing toward and retreating from said chuck, means for selectively rotating said plunger in one direction through predetermined angles while said plunger is advanced to a position adjacent to said chuck.

18. The combination in a machine for working on buttons, of a chuck, a button engaging plunger capable of advancing toward and retreating from said chuck, means for selectively rotating said plunger in one direction through predetermined angles while said plunger is advanced to a position adjacent to said chuck, means for withdrawing said plunger and rotating said plunger in the reverse direction.

19. In a machine for working on buttons, the combination of a chuck capable of holding a button therein, a plunger having a plurality of pins in the end thereof capable of advancing to said chuck and engaging its pins with the holes in the button held thereby, means for yieldingly holding said plunger against the button while said plunger is rotating to carry the pins in the end thereof into lines with the button holes and then into engagement therewith.

20. In a machine for working on buttons, the combination of a chuck capable of holding a button therein, a plunger having a plurality of pins in the end thereof capable of advancing to said chuck and engaging its pins with the holes in the button held thereby, means for yieldingly holding said plunger against the button while said plunger is rotating to carry the pins in the end thereof into line with the button holes and then into engagement therewith, means for withdrawing said plunger and rotating it in the reverse direction, leaving said button with its holes in a predetermined angular position.

21. The combination in a machine for working on buttons, of a chuck, a button-engaging plunger capable of advancing toward and retreating from said chuck, means for selectively rotating said plunger in one direction to any one of a series of predetermined points while said plunger is advanced to a position adjacent to said chuck.

22. The combination in a machine for working on buttons, of a chuck, a button-engaging plunger capable of advancing toward and retreating from said chuck, means for selectively rotating said plunger in one direction to any one of a series of predetermined points while said plunger is advanced to a position adjacent to said chuck, means for withdrawing said plunger and rotating said plunger in the reverse direction to the starting point.

23. In a machine for working on buttons, the combination of a dial plate, a chuck ring yieldingly supported in and passing through said dial plate, a chuck cup supported in said chuck ring.

24. In a machine for working on buttons, the combination of a dial plate, a chuck ring yieldingly supported in said dial plate, a chuck cup supported in said chuck ring, fingers pivotally mounted in said chuck ring and projecting over the upper edge of said chuck cup to engage a button therein.

25. In a machine for working on buttons, the combination of a dial plate, a chuck ring yieldingly supported in and passing through said dial plate, a chuck cup supported in said chuck ring, fingers pivotally mounted in said chuck ring and projecting over the upper edge of said chuck cup, said fingers being capable of engaging the button in said chuck cup.

26. In a machine for working on buttons, the combination of a dial plate, a chuck ring yieldingly supported in said dial plate, a chuck cup supported in said chuck ring, fingers pivotally mounted in said chuck ring and projecting over the upper edge of said chuck cup, said fingers being capable of engaging the button in said chuck cup, means for raising said cup in said chuck ring and releasing the button in said cup from the grip of said fingers.

27. In a machine for working on buttons, the combination of a dial plate having recesses therein, chuck rings mounted in said recesses, pockets cut in said dial plate and opening into said recesses, thimbles yieldingly mounted in said recesses and interlocked with said chuck ring.

28. In a machine for working on buttons, the combination of a dial plate having recesses therein, chuck rings having flanges thereon inserted in the recesses of said dial plate from below, said flanges engaging with said dial plate and limiting the upward travel of said rings, pockets in said dial plate opening into said recesses, said pockets being open at the top and closed at the bottom, thimbles inserted in said pockets from above, said thimbles being interlocked with said rings to lock both said thimbles and rings in position.

29. In a machine for working on buttons, the combination of a dial plate having recesses therein, chuck rings having flanges thereon inserted in said recesses from below, said flanges limiting the upward travel of said rings, pockets in said dial plate opening into said recesses, recesses in said chuck ring opposite said pockets, said recesses being arranged in pairs and spaced apart by a short flange, a thimble inserted in each of said pockets, each of said thimbles being cylindrical in shape and having a recess therearound opposite said short flanges, and capable of being engaged by said flanges.

30. In a machine for working on buttons, the combination of a dial plate having recesses therein, chuck rings having flanges thereon inserted in said recesses from below, said flanges limiting the upward travel of said rings, pockets in said dial plate opening into said recesses, recesses in said chuck ring opposite said pockets, said recesses being arranged in pairs and spaced apart by a short flange, a thimble inserted in each of said pockets, each of said thimbles being cylindrical in shape and having a recess therearound opposite said short flanges, and capable of being engaged by said flanges, a portion of said thimble being cut away to permit the insertion of the thimble in its pocket, said thimble then being capable of rotation to engage the flange on the chuck ring with the recess in the thimble.

31. In a machine for working on buttons, the combination of a dial plate having recesses therein, chuck rings having flanges thereon inserted in said recesses from below, said flanges limiting the upward travel of said rings, pockets in said dial plate opening into said recesses, recesses in said chuck ring opposite said pockets, said recesses being arranged in pairs and spaced apart by a short flange, a thimble inserted in each of said pockets, each of said thimbles being cylindrical in shape and having a recess therearound opposite said short flanges, and capable of being engaged by said flanges, a portion of said thimble being cut away to permit the insertion of the thimble in its pocket, said thimble then being capable of rotation to engage the flange on the chuck ring with the recess in the thimble, said thimble being again cut away to provide a recess for locking said thimble in engagement with the short flange of the chuck ring to prevent the rotation thereof.

32. In a machine for working on buttons, the combination of a dial plate, button holding chucks carried therein, pockets in said dial plate open at the top and the side, thimbles contained in said pockets, each of said thimbles being hollow and containing a compression spring therein which bears against the bottom of said pocket and presses the thimble upwardly in said pocket, said thimbles engaging with said chucks and holding them in said dial plate.

33. In a machine for working on buttons, the combination of a dial plate, button holding chucks carried therein, pockets in said dial plate open at the top and the side, thimbles contained in said pockets, each of said thimbles being hollow and containing a compression spring therein which bears against the bottom of said pocket and presses the thimble upwardly in said pocket, means for limiting the upward travel of said thimble in its pocket, said thimbles engaging with said chucks and holding them in said dial plate.

34. In a machine for working on buttons, the combination of a dial plate, button holding chucks carried therein, pockets in said dial plate open at the top and the side, thimbles contained in said pockets, each of said thimbles being cylindrical in shape and having a recess therearound, dividing the cylindrical surface of the thimble into an upper and lower portion, a segment cut out of said lower cylindrical portion to the full width thereof, a narrow segment cut out of said lower cylindrical portion adjacent to said recess, said second segment being cut away at an angle to said first segment, said thimbles engaging with said chucks and holding them in said dial plate.

35. In a machine for working on buttons, the combination of a chuck ring, a chuck cup mounted to slide therein, fingers mounted to swing therein, pins passing through said chuck ring as chords on which said fingers are mounted.

36. In a machine for working on buttons, the combination of a chuck ring, a chuck cup mounted to slide therein, fingers mounted to swing therein, pins passing through said chuck ring as chords on which said fingers are mounted, said chuck being cut away at the bottom to afford clearance to said fingers and their supporting pins, said pins limiting the downward travel of the chuck cup, a projection on said chuck cup engaging under one of said pins and limiting the upward travel thereof.

37. In a machine for working on buttons, the combination of a chuck ring, a chuck cup mounted to slide therein, fingers pivotally mounted in the chuck ring having projections extending over the top of the chuck cup, cams on said fingers bearing against said chuck cup, by which said fingers are pressed back on the upward movement of said chuck cup.

38. In a machine for working on buttons, the combination of a chuck ring, a chuck cup mounted to slide therein, fingers pivotally mounted in the chuck ring having projections extending over the top of the chuck cup, cams on said fingers bearing against said chuck cup, by which said fingers are pressed back on the upward movement of said chuck cup, springs normally pressing said fingers forward at the top so that the projections thereon overhang said chuck cup.

39. In a machine for working on buttons, the combination of a dial plate, a chuck ring yieldingly supported therein, a chuck cup supported in said chuck ring and having a vertical movement therein, said chuck cup being capable of yielding first independently of the chuck ring and thereafter with said chuck ring.

40. In a machine for working on buttons, the combination of a dial plate, a chuck ring yieldingly supported therein, a chuck cup supported in said chuck ring and having a vertical movement therein, said chuck cup being capable of yielding first independently of the chuck ring and thereafter with said chuck ring, spring supported thimbles interposed between said chuck ring and said dial plate, said thimbles permitting said chuck ring to yield slightly independent of the dial plate.

41. In a machine for working on buttons, the combination of a dial plate and a chuck ring, said chuck ring having a stepped engagement in one direction with said dial plate, thimbles interlocking with said chuck ring and engaging with said dial plate, forming therefor a stepped engagement with the dial plate in the other direction.

42. In a machine for working on buttons, the combination of a dial plate, a chuck ring mounted therein, a recess in said dial plate at the side of said chuck ring, a thimble capable of insertion into said recess at the side of said dial plate, said thimble being capable of rotating into engagement with said chuck ring and being then capable of longitudinal movement into locked engagement with said chuck ring.

43. In a machine for working on buttons, the combination of a dial plate, a chuck ring mounted therein, a recess in said dial plate at the side of said chuck ring, a thimble capable of insertion into said recess at the side of said dial plate, said thimble being capable of rotating into engagement with said chuck ring and being then capable of longitudinal movement into locked engagement with said chuck ring, a spring for yieldingly holding said thimble in said locked engagement.

44. In a machine for working on buttons, the combination of a dial plate, a chuck cup yieldingly supported therein and capable of vertical movement therein, a spring pressed pawl mounted in the path of movement of said dial plate and engaging with said cup to lift it.

45. In a machine for working on buttons, the combination of a dial plate, a chuck cup yieldingly supported therein and capable of vertical movement therein, a spring pressed pawl mounted in the path of movement of said dial plate and engaging with said cup to lift it and hold it in an elevated position while passing said pawl.

46. In a machine for working on buttons, the combination of a dial plate, a chuck ring mounted therein, a chuck cup mounted to move vertically in said chuck ring, a cam block mounted in said machine in the path of travel of said chuck cup for lifting said cup in said chuck ring.

47. In a machine for working on buttons, the combination of a dial plate, a chuck ring mounted therein, a chuck cup mounted to move vertically in said chuck ring, a pawl mounted in said machine in the path of travel of said chuck cup for lifting said cup in said chuck ring, fingers normally projecting over the top of said chuck cup, said fingers being withdrawn by the upward movement of said chuck cup.

48. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate.

49. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said pawl being then released to permit the downward movement of said cup in conjunction therewith.

50. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said pawl being then released to permit the downward movement of said cup in conjunction therewith, a stop for said pawl by which said pawl and said chuck cup are positively held in a predetermined position.

51. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said chuck cup being capable of receiving a button therein, a plunger for pressing the button down in said cup and engaging with the button to rotate it in the cup.

52. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said pawl being then released to permit the downward movement of said cup in conjunction therewith, said chuck cup being capable of receiving a button therein, a plunger for pressing the button down in said cup and engaging with the button to rotate it in the cup.

53. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said pawl being then released to permit the downward movement of said cup in conjunction therewith, a stop for said pawl by which said pawl and said chuck cup are positively held in a predetermined position, said chuck cup being capable of receiving a button therein, a plunger for pressing the button down in said cup and engaging with the button to rotate it in the cup.

54. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said chuck cup being capable of receiving a button therein, a plunger for pressing the button down in said cup and engaging with the button to rotate it in the cup, fingers overhanging the edge of said chuck cup when in its lowest position and yieldingly gripping the button contained therein.

55. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said pawl being then released to permit the downward movement of said cup in conjunction therewith, said chuck cup being capable of receiving a button therein, a plunger for pressing the button down in said cup and engaging with the button to rotate it in the cup, fingers overhanging the edge of said chuck cup when in its lowest position and yieldingly gripping the button contained therein.

56. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said pawl being then released to permit the downward movement of said cup in conjunction therewith, a stop for said pawl by which said pawl and said chuck cup are positively held in a predetermined position, said chuck cup being capable of receiving a button therein, a plunger for pressing the button down in said cup and engaging with the button to rotate it in the cup, fingers overhanging the edge of said chuck cup when in its lowest position and yieldingly gripping the button contained therein.

57. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said chuck cup being capable of receiving a button therein, a plunger for pressing the button down in said cup and engaging with the button to rotate it in the cup, fingers overhanging the edge of said chuck cup when it its lowest position and yieldingly gripping the button contained therein, said fingers being released by the upward movement of said cup.

58. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said pawl being then released to permit the downward movement of said cup in conjunction therewith, said chuck cup being capable of receiving a button therein, a plunger for pressing the button down in said cup and engaging with the button to rotate it in the cup, fingers overhanging the edge of said chuck cup when in its lowest position and yieldingly gripping the button contained therein, said fingers being released by the upward movement of said cup.

59. In a machine for working on buttons, the combination of a dial plate, a chuck cup yieldingly supported therein and mounted to move vertically therein, a positively actuated pawl in the path of movement of said chuck cup, operating to positively lift said chuck cup in said dial plate, said pawl being then released to permit the downward movement of said cup in conjunction therewith, a stop for said pawl by which said pawl and said chuck cup are positively held in a predetermined position, said chuck cup being capable of receiving a button therein, a plunger for pressing the button down in said cup and engaging with the button to rotate it in the cup, fingers overhanging the edge of said chuck cup when in its lowest position and yieldingly gripping the button contained therein, said fingers being released by the upward movement of said cup.

60. In a machine for working on buttons, the combination of a dial plate, a chuck cup yieldingly supported therein and capable of vertical movement therein, said cup being capable of receiving a button therein, fingers overhanging the edge of said cup to grip a button therein, a spring pressed pawl movable in the path of movement of said dial plate and engaging with said cup to lift it.

61. In a machine for working on buttons, the combination of a dial plate, a chuck cup yieldingly supported therein and capable of vertical movement therein, said cup being capable of receiving a button therein, fingers overhanging the edge of said cup to grip a button therein, a spring pressed pawl movable in the path of movement of said dial plate and engaging with said cup to lift it, the upward movement of said cup causing said fingers to be withdrawn from contact with the button.

62. In a machine for working on buttons, the combination of a dial plate, a chuck cup mounted therein, a feeding mechanism for delivering a button to said chuck cup, said feeding mechanism comprising a ring with a chute leading thereto, a plunger working in said ring capable of arresting the button at the edge of the ring, means for lifting said plunger and permitting said button to drop into said ring, a pair of pawls mounted in said ring for engaging with the button and supporting it, a plunger being capable of a downward movement to engage with the button and force it past said pawls into the cup.

63. In a machine for working on buttons, the combination of a chuck cup for receiving a button, a feeding device for delivering the button to said cup, said feeding device comprising a ring through which the button travels to said cup, pawls in said ring for arresting the button in said ring.

64. In a machine for working on buttons, the combination of a chuck cup for receiving a button, a feeding device for delivering the button to said cup, said feeding device comprising a ring through which the button travels to said cup, pawls in said ring for arresting the button in said ring, means for forcing the button past said pawls into said cup.

65. In a machine for working on buttons, the combination of a chuck cup for receiving a button, a feeding device for delivering the button to said cup, said feeding device comprising a ring through which the button travels to said cup, pawls in said ring for arresting the button in said ring, means for forcing the button past said pawls into said cup, said means being capable of engaging with a button to rotate it in the cup.

66. In a machine for working on buttons, the combination of a chuck cup, a feeding mechanism for feeding a button to said chuck cup, said feeding mechanism including a ring and a button engaging plunger, said chuck cup being mounted to move across the lower end of said ring, a section of said ring being mounted to swing ahead of the button being carried into the chuck cup.

67. In a machine for working on buttons, the combination of a chuck cup, a feeding mechanism for feeding a button to said chuck cup, said feeding mechanism including a ring and a button engaging plunger, said chuck cup being mounted to move across the end of said ring, a portion of said ring being pivotally mounted to yield in the direction of movement of said chuck cup.

68. In a machine for working on buttons, the combination of a chuck cup, a feeding mechanism for feeding a button to said chuck cup, said feeding mechanism including a ring and a button engaging plunger, said chuck cup being mounted to move across the end of said ring, portions of said ring being pivotally mounted to yield in the direction of movement of said chuck cup.

69. In a machine for working on buttons, the combination of a feeding ring, pawls mounted on opposite sides thereof and projecting into the ring, a section of said ring between said pawls being yieldingly mounted therein and swinging inward at the bottom.

70. In a machine for working on buttons, the combination of a feeding ring, pawls mounted on opposite sides thereof and projecting into the ring, a section of said ring between said pawls being yieldingly mounted therein and swinging inward at the bottom, a portion of said ring being pivotally mounted opposite thereto and swinging outward from said ring.

71. In a machine for working on buttons, the combination of a feeding ring, a section of said ring being yieldingly mounted therein and swinging inward at the bottom, a portion of said ring being pivotally mounted opposite thereto and swinging outward from said ring, the axis on which said first named section swings being arranged horizontally and the axis on which said second named section swings being arranged vertically.

72. In a machine for working on buttons, the combination of a feeding ring, a chute leading thereto, said chute terminating in a plate concentric to and attached to said feeding ring.

73. In a machine for working on buttons, the combination of a feeding ring, a chute leading thereto, said chute terminating in a plate concentric to said feeding ring, a pair of studs on said ring, slots in said plate engaging with said studs.

74. In a machine for working on buttons, the combination of a feeding ring, a chute leading thereto, said chute terminating in a plate concentric to said feeding ring, a pair of studs on said ring, slots in said plate engaging with said studs, each of said slots when in engagement with said studs at the inner end of said slots being concentric with the stud engaging the other slot.

75. In a machine for working on buttons, the combination of a plunger having a reduced hollow end, a block mounted to slide in said hollow end, a pin block mounted in said block, a pin passing through said block and said pin block and a slot in said reduced end permitting a sliding engagement of said block and said pin block in said reduced end.

76. In a machine for working on buttons, the combination of a plunger having a reduced hollow end, a block mounted to slide in said hollow end, a pin passing through said block and a slot in said reduced end permitting a sliding engagement of said block in said reduced end, a pin block mounted in said first named block and secured therein by said pin.

77. In a machine for working on buttons, the combination of a plunger having a reduced hollow end, a sleeve mounted to slide on said reduced end, a block mounted to slide in said reduced end, means for limiting the travel of said sleeve and said block on said plunger, springs for holding said sleeve and said block at the lowest point of travel, said sleeve normally encircling and concealing said block.

78. In a machine for working on buttons, the combination of a plunger having a reduced hollow end, a sleeve mounted to slide on said reduced end, a block mounted to slide in said reduced end, means for limiting the travel of said sleeve and said block on said plunger, springs for holding said sleeve and said block at the lowest point of travel, said sleeve normally encircling and concealing said block, said sleeve being capable of movement independent of said block and said plunger to expose the end of said block.

79. In a machine for working on buttons, the combination of a dial plate, a chuck cup mounted therein, said chuck cup being capable of receiving a button therein, a plunger capable of movement into engagement with the button in said chuck, said plunger having a reduced end with a sleeve mounted on the outside thereof and a block mounted on the inside thereof, said parts being normally so positioned as to cause said sleeve to engage the button first and force it into its chuck, and thereafter engage the pin block with said button, means for rotating said plunger to cause the rotation of said button in its chuck.

80. In a machine for working on buttons, the combination of a chuck cup capable of holding a button therein, a plunger capable of coöperating with the button in said cup, said plunger having a movable sleeve and pin block and operating to engage the sleeve first with the button and thereafter engage the pin block with said button.

81. In a machine for working on buttons, the combination of a chuck cup capable of holding a button therein, a plunger capable of coöperating with the button in said cup, said plunger having a movable sleeve and pin block and operating to engage the sleeve first with the button and thereafter engage the pin block with said button, means for holding the button against rotation in said cup during the rotation of said plunger, means for thereafter engaging the button with said plunger and causing the button to rotate with said plunger.

82. In a machine for working on buttons, the combination of a chuck cup for receiving a button with holes therein, a plunger having a pin block yieldingly mounted therein, said pin block having pins rigidly mounted therein, means for advancing said plunger to engage the pins of said block with said button, means for rotating said plunger to carry the pins of said block into engagement with the holes of the button, the button thereafter rotating with said plunger in one direction, means for positively withdrawing said plunger and rotating it in the reverse direction, leaving said button in its rotated position.

83. In a machine for working on buttons, the combination of a chuck capable of receiving a button therein, means for engaging with the button in said chuck and rotating the button to a predetermined position, said means being then drawn out of engagement with said button, leaving the button in a predetermined position in the chuck.

84. In a machine for working on buttons, the combination of a framework, a plunger mounted to reciprocate and oscillate therein, a shaft mounted to rotate in said framework, having a plurality of cams thereon, one of said cams operating on said plunger through suitable mechanism to reciprocate it, and the other of said cams operating on said plunger through suitable mechanism to oscillate it.

85. In a machine for working on buttons, the combination of a framework, a plunger mounted to reciprocate therein, a shaft mounted to rotate in said framework and having a cam thereon, a pair of levers and a link for communicating the movement of said cam to said plunger, a yoke interposed between said plunger and one of said levers, permitting said plunger to travel therewith in a straight line direction, and to oscillate therein.

86. In a machine for working on buttons, the combination of a framework, a plunger mounted to reciprocate and oscillate therein, a shaft mounted to rotate in said framework having a plurality of cams thereon, one of said cams operating on said plunger through a pair of levers and a link to reciprocate said plunger, the other of said cams operating on said plunger through a lever, a link and a rack to oscillate said plunger, said plunger having an elongated pinion formed thereon to maintain sliding engagement with said rack.

87. In a machine for working on buttons, the combination of a plunger capable of reciprocation and oscillation, a spring operating to force said plunger down, a cam operating to rotate said plunger in one direction, a cam operating to lift said plunger, and a spring operating to rotate said plunger in the reverse direction.

88. In a machine for working on buttons, the combination of a plunger and a support in which said plunger can reciprocate and oscillate, a shaft mounted adjacent to said plunger, a cam mounted on said shaft, a pair of levers connected by a link for transmitting the motion of said cams to said plunger to positively lift said plunger, a spring connected to said train of mechanism to yieldingly force said plunger downward, a cam operating through a lever, link and rack to rotate said plunger forward for the purpose of positioning a button thereby, a spring connected to said train of mechanism for the purpose of moving said rack in the reverse direction to rotate said plunger backward.

89. In a machine for working on buttons, the combination of a support, a plunger mounted to reciprocate and oscillate therein, a spring connected to said plunger to force said plunger down, a cam connected to said plunger to rotate said plunger forward in one direction for the purpose of positioning a button, a cam connected to said plunger for the purpose of lifting it out of engagement with said button after its rotation therewith is completed, a spring for rotating said plunger in the reverse direction to the starting point.

90. In a machine for working on buttons, the combination of a dial plate having a chuck cup therein, a button feeding mechanism and a justifying mechanism operable to turn the button in its chuck cup, means for rotating said dial plate by intermittent steps, said dial plate in its rotation carrying said chuck cup first to the button feeding mechanism, second to an intermediate point where the chuck cup with its button is exposed, and third to the justifying mechanism.

91. In a machine for working on buttons, the combination of a dial plate having a chuck cup therein for exposing the button, a button feeding mechanism, a justifying mechanism operable to turn the button in its chuck cup and an embossing die operating to emboss a pattern on a button in said cup and means for rotating said dial plate by intermediate steps, first to said button feeding mechanism, second to an intermediate point where the chuck cup with its button is exposed, third to said justifying mechanism, and fourth to said embossing die.

92. In a machine for working on buttons, the combination of a dial plate having a chuck cup therein, a button feeding mechanism and a justifying mechanism operable to turn the button in its chuck cup, an embossing die operating to emboss a pattern on the button in the cup, a second embossing die operating to increase the embossing effect on said button, means for rotating said dial plate by intermittent steps, said dial plate in its rotation carrying said chuck cup first to the button feeding mechanism, second to an intermediate point where the chuck cup with its button is exposed, third to the justifying mechanism, fourth to the first embossing die, fifth to the second embossing die.

93. In a machine for working on buttons, the combination of a dial plate having a chuck cup therein, a button feeding mechanism and a justifying mechanism operable to turn the button in its chuck cup, an embossing die operating to emboss a pattern on the button in the cup, a second embossing die operating to increase the embossing effect on said button, means for rotating said dial plate by intermittent steps, said dial plate in its rotation carrying said chuck cup first to the button feeding mechanism, second to an intermediate point where the chuck cup with its button is exposed, third to the justifying mechanism, fourth to the first embossing die, fifth to the second embossing die, means for stopping and holding the dial plate in each of said five positions.

94. In a machine for working on buttons, the combination of a dial plate having a chuck cup therein, a button feeding mechanism and a justifying mechanism engaging with the perforations in said button and operable to turn the button in its chuck cup, an embossing die operating to emboss a pattern on the button in the cup, a second embossing die operating to increase the embossing effect on said button and an ejector for removing the button from said cup, means for rotating said dial plate by intermittent steps, said dial plate in its rotation carrying said chuck cup first to the button feeding mechanism, second to an intermediate point where the chuck cup with its button is exposed, third to the justifying mechanism, fourth to the first embossing die, fifth to the second embossing die and then to the ejector.

95. In a machine for working on buttons, the combination of a justifying mechanism comprising a plunger capable of a reciprocating and an oscillating motion, means for reciprocating said plunger through a uniform motion, means for oscillating said plunger through a variable motion.

96. In a machine for working on buttons, the combination of a plunger adapted to engage a button at one end thereof, a plurality of wheels surrounding said plunger, means for oscillating said wheels through different angular movements, a means for each of said wheels to clutch the plunger thereto to cause said plunger to oscillate with any one of said wheels, said means operating independently of the reciprocating of the plunger to clutch the plunger.

97. In a machine for working on buttons, the combination of a plunger adapted to engage a button at one end thereof, a shaft mounted to oscillate adjacent thereto, a set of pinions of different diameters keyed thereto, pinions mounted upon said plunger meshing with the pinions of said shaft, said shaft and both sets of pinions rotating in unison.

98. In a machine for working on buttons, the combination of a plunger adapted to engage a button at one end thereof, a shaft mounted to oscillate adjacent thereto, a set of pinions of different diameters keyed thereto, pinions mounted upon said plunger meshing with the pinions of said shaft, said shaft and both sets of pinions rotating in unison, means for coupling each pinion of said second set to the plunger to cause the plunger to move therewith, said means operating independently of the reciprocating of the plunger.

99. In a machine for working on buttons, the combination of a plunger adapted to engage a button at one end thereof, a shaft mounted to oscillate parallel thereto, a set of pinions of different diameters keyed thereto, pinions mounted upon said plunger meshing with the pinions of said shaft, said shaft and both sets of pinions rotating in unison.

100. In a machine for working on buttons, the combination of a plunger adapted to engage a button at one end thereof, a shaft mounted to oscillate parallel thereto, a set of pinions of different diameters keyed thereto, pinions mounted upon said plunger meshing with the pinions of said shaft, said shaft and both sets of pinions rotating in unison, means for coupling one pinion only at a time of said second set to the plunger to cause the plunger to move therewith.

101. In a machine for working on buttons, the combination of a plunger, a shaft mounted to oscillate adjacent thereto, gearing between said plunger and said shaft whereby the uniform oscillation of said shaft can produce different oscillations in said plunger, a pinion on said shaft, a rack engaging therewith, a cam and levers for driving said rack in one direction and a spring for driving said rack in the reverse direction.

102. In a machine for working on buttons, the combination of a plunger, a pinion mounted to rotate thereon, said pinion having a collar integral therewith, a ring surrounding said collar and fastened thereto, an opening extending diametrically through said ring and through one side of said collar, a key mounted to slide in said collar, a key-way in said plunger with which said key can engage.

103. In a machine for working on buttons, the combination of a plunger, a pinion mounted to rotate thereon, said pinion having a collar integral therewith, a ring surrounding said collar and fastened thereto, an opening extending diametrically through said ring and through one side of said collar, a key mounted to slide in said collar, a key-way in said plunger with which said key can engage, means for driving said key forward into engagement with said plunger and holding it there during a complete oscillation of the plunger.

104. In a machine for working on buttons, the combination of a plunger, a pinion mounted to rotate thereon, said pinion having a collar integral therewith, a ring surrounding said collar and fastened thereto, an opening extending diametrically through said ring and through one side of said collar, a key mounted to slide in said collar, a key-way in said plunger with which said key can engage, means for driving said key forward into engagement with said plunger and holding it there during a complete oscillation of the plunger, said plunger operating by an endwise movement to force said key out of engagement therewith.

105. In a machine for working on buttons, the combination of a button locating plunger, a pinion mounted to rotate thereon, a ring surrounding said pinion and rigid therewith, a casing surrounding said ring, a curved race in said casing surrounding said ring.

106. In a machine for working on buttons, the combination of a plunger, a pinion having a ring thereon surrounding said plunger, a radial opening in said pinion, a key carried in said radial opening, a ball capable of insertion therein for forcing said key into engagement with said plunger, said ball, key, pinion and ring rotating in unison with said plunger during the engagement between the key and the plunger.

107. In a machine for working on buttons, the combination of a plunger, a pinion oscillating thereon, a key operating to engage said pinion with said plunger and carry the plunger with said pinion, a casing surrounding said pinion, means carried in said casing for moving said key into engagement with said plunger.

108. In a machine for working on buttons, the combination of a plunger, a pinion and ring surrounding said plunger, a key carried therein, said pinion being adapted to oscillate around said plunger, means for positively moving and holding said key in engagement with said plunger, said key being normally held out of engagement with said plunger during the oscillation of said pinion by centrifugal force.

109. In a machine for working on buttons, the combination of a casing, a plunger mounted to reciprocate and oscillate therein, a series of pinions and rings surrounding said plunger in said casing, a key carried by each pinion and ring for connecting with said plunger, means carried in said casing for positively driving each of said keys into engagement with the plunger to cause said plunger and said pinions to oscillate in unison.

110. In a machine for working on buttons, the combination of a casing, a plunger mounted to reciprocate and oscillate therein, a series of pinions and rings surrounding said plunger in said casing, a key carried by each pinion and ring for connecting with said plunger, means carried in said casing for positively driving each of said keys into engagement with the plunger and holding it in engagement therewith to cause said plunger and said pinions to oscillate in unison, independent of said driving means in the casing.

111. In a machine for working on buttons, the combination of a plunger adapted to engage with the button, a pinion and ring surrounding said plunger, a cylindrical opening in one side of said ring, said cylindrical opening having a reduced end, a key having a shoulder thereon engaging with said cylindrical opening, said shoulder holding said key in said cylindrical opening.

112. In a machine for working on buttons, the combination of a plunger, a pinion and ring surrounding said plunger, a cylindrical opening in one side of said ring, said cylindrical opening having a reduced end, a key having a shoulder thereon engaging with said cylindrical opening, said shoulder holding said key in said cylindrical opening, said key having a flattened end, a rectangular slot in said pinion with which said flattened end engages.

113. In a machine for working on buttons, the combination of a dial plate having a chuck cup therein, said chuck cup being capable of holding a button therein, a plunger capable of reciprocating into and out of contact with said button without rotating said button, means for causing said plunger to rotate a predetermined amount at will.

114. In a machine for working on buttons, the combination of a dial plate having a chuck cup therein, said chuck cup being capable of holding a button therein, a plunger capable of reciprocating into and out of contact with said button either with or without rotating said button, means for causing said plunger to rotate predetermined amounts at will, means for embossing the button located by said plunger.

115. In a machine for working on buttons, the combination of a button locating plunger, a casing, a series of levers pivoted thereon, interlocking blocks between said levers permitting the operation of but one thereof at a time, said blocks holding said levers locked in their operated position, means for moving all of said levers sidewise simultaneously, means operating between said levers and said plunger for oscillating said plunger, said lever controlling said means.

116. In a machine for working on buttons, the combination of a support, a series of levers pivoted thereon, interlocking blocks between said levers permitting the operation of but one thereof at a time, said blocks holding said levers locked in their operated positions, means for moving all of said levers sidewise simultaneously, a casing, pins mounted in said casing, one for each lever, each lever being capable when in its operated position and when swung sidewise of engaging with its pin and pushing it into the casing.

117. In a machine for working on buttons, the combination of a support, a series of levers pivoted thereon, interlocking blocks between said levers permitting the operation of but one thereof at a time, said blocks holding said levers locked in their operated position, means for moving all of said levers sidewise simultaneously, a casing, pins mounted in said casing, one for each lever, each lever being capable when in its operated position and when swung sidewise of engaging with its pin and pushing it into the casing, a plunger within the casing, a pinion oscillating idly around said plunger, a key for coupling said pinion to said plunger, said pin being capable of operating said key to couple said pinion and plunger together and cause them to oscillate in unison.

118. In a machine for working on buttons, the combination of a casing, a button locating plunger therein, means for moving said plunger up and down, a plate pivoted on said casing, a cam operated by said plunger, causing said plate to swing as said plunger reciprocates, means between said plunger and said plate for causing said plunger to oscillate.

119. In a machine for working on buttons, the combination of a casing, a button locating plunger therein, means for moving said plunger up and down, a plate pivoted on said casing, a cam operated by said plunger causing said plate to swing toward the casing as said plunger descends, levers pivotally mounted on said plate, means between said plunger and said levers for causing said plunger to oscillate.

120. In a machine for working on buttons, the combination of a casing, a button locating plunger therein, means for moving said plunger up and down, a plate pivoted on said casing, a cam operated by said plunger causing said plate to swing toward the casing as said plunger descends, levers pivotally mounted on said plate, pins mounted to slide in said casing, said pins being located on the casing normally out of the path of travel of the levers, means between said pins and plunger for causing the plunger to oscillate.

121. In a machine for working on buttons, the combination of a casing, a plunger therein, means for moving said plunger up and down, a plate pivoted on said casing, a cam operated by said plunger causing said plate to swing toward the casing as said plunger descends, levers pivotally mounted on said plate, pins mounted to slide in said casing, said pins being located on the casing normally out of the path of travel of the levers, means for holding any one of said levers in an abnormal position, causing it to engage with its pin on the swinging of the plate, said lever then pushing said pin into the casing.

122. In a machine for working on buttons, the combination of a series of levers arranged in a row, an interlocking channel arranged adjacent thereto, a series of interlocking blocks mounted to slide therein, some of said blocks being cup shaped on one end and flat on the other end, each of said levers operating to spread the blocks adjacent thereto and lock itself in engagement therewith and lock the remaining levers out of operation.

123. In a machine for working on buttons, the combination of a series of levers arranged in a row, an interlocking channel arranged adjacent thereto, a series of interlocking blocks mounted to slide therein, some of said blocks being cup shaped on one end and flat on the other end, each of said levers operating to spread the blocks adjacent thereto and lock itself in engagement therewith and lock the remaining levers out of operation, the blocks on one side of each of said levers being capable of movement away therefrom to release the lever and permit its return to normal position.

124. In a machine for working on buttons, the combination of operating levers, an interlocking mechanism for controlling said levers, said interlocking mechanism comprising a channel, blocks sliding in said channel, a shoulder in said channel, a plate bearing against said shoulder, said plate moving the blocks downward until it is arrested by said shoulder, a spring for yieldingly holding said plate in position, a spring at the other end of said channel pressing said blocks against said plate, said first named spring being stronger than the second named spring.

125. In a machine for working on buttons, the combination of operating levers, an interlocking mechanism for controlling said levers, said interlocking mechanism comprising a channel, blocks sliding in said channel, a shoulder in said channel, a plate bearing against said shoulder and arresting the movement of the blocks thereby, a spring for yieldingly holding said plate in position, a spring at the other end of said channel pressing said blocks against said plate, said first named spring being stronger than the second named spring, a pin passing through said plate and through all of said blocks except the last one, and bearing against the last block, means for moving said pin longitudinally against said block to compress the spring and permit the remaining blocks to move in the same direction.

126. In a machine for working on buttons, the combination of operating levers, an interlocking mechanism for controlling said levers, said interlocking mechanism comprising a channel, blocks sliding in said channel, a shoulder in said channel, a plate bearing against said shoulder and arresting the movement of the blocks thereby, a spring for yieldingly holding said plate in position, a spring at the other end of said channel pressing said blocks against said plate, said first named spring being stronger than the second named spring, means for compressing the weak spring to permit all of the blocks to move in its direction.

127. In a machine for working on buttons, the combination of a button locating plunger, a casing, a plate pivotally mounted thereon, levers pivotally mounted on said plate, springs for holding said levers in normal position, said levers being movable to operable position, means for locking said levers in said operable position and means for operating between said levers and said plunger for causing the latter to oscillate.

128. In a machine for working on buttons, the combination of a button locating plunger, a casing, a plate pivotally mounted thereon, levers pivotally mounted on said plate, springs for holding said levers in normal position, said levers being movable to operable position, means for locking said levers in said operable position, means for unlocking said levers and permitting the return thereof to normal position and means for operating between said levers and said plunger for causing the latter to oscillate.

129. In a machine for working on buttons, the combination of a casing, a button locating plunger reciprocating therein, a plate pivoted thereon, a cam operated by said plunger engaging with said plate and causing said plate to swing toward said casing and operating between said plate and plunger for causing the plunger to oscillate.

130. In a machine for working on buttons, the combination of a casing, a plunger reciprocating therein, a plate pivoted thereon, a cam operated by said plunger engaging with said plate and causing said plate to swing toward said casing, gearing and clutch mechanism carried within said casing capable of causing the oscillation of said plunger, means carried by said plate capable of throwing said gearing and clutch mechanism into operation in connection with the plunger to cause the rotation of the plunger.

131. In a machine for working on buttons, the combination of a casing, of a plunger reciprocating and oscillating therein, a cam plate fastened to said plunger, a bar mounted to reciprocate on said casing, said cam plate being normally carried over said bar without engaging the same during a portion of the oscillation, said plate engaging with said bar on the downward movement of the plunger and carrying said bar therewith, a cam on said bar, a plate pivotally mounted on said casing and having an arm engaged by said cam by which said plunger on its downward movement carries said bar with it and causes said plate to swing toward the casing.

132. In a machine for working on buttons, the combination of a casing, of a plunger reciprocating and oscillating therein, a cam plate fastened to said plunger, a bar mounted to reciprocate on said casing, said cam plate being normally carried over said bar without engaging the same during a portion of the oscillation, said plate engaging with said bar on the downward movement of the plunger and carrying said bar therewith, a cam on said bar, a plate pivotally mounted on said casing and having an arm engaged by said cam by which said plunger on its downward movement carries said bar with it and causes said plate to swing toward the casing, levers pivoted on said plate, interlocking mechanism capable of preventing the operation of more than one lever at a time and securing the locking of said operated lever, a bar passing through said interlocking mechanism, a projection carried on the first named bar capable of engaging with the bar passing through the interlocking mechanism to move the bar and cause the release of the interlock.

133. In a machine for working on buttons, the combination of a casing, of a plunger reciprocating and oscillating therein, a cam plate fastened to said plunger, a bar mounted to reciprocate on said casing, said cam plate being normally carried over said bar without engaging the same during a portion of the oscillation, said plate engaging with said bar on the downward movement of the plunger and carrying said bar therewith, a plate mounted on said bar, a pin mounted thereon, a cam carried on said cam plate capable of moving across the bar, carrying said bar, plate and pin down through an extra movement only upon the oscillation of the plunger.

134. In a machine for working on buttons, the combination of a casing, of a plunger reciprocating and oscillating therein, a cam plate fastened to said plunger, a bar mounted to reciprocate on said casing, said cam plate being normally carried over said bar without engaging the same during a portion of the oscillation, said plate engaging with said bar on the downward movement of the plunger and carrying said bar therewith, a plate mounted on said bar, a pin mounted thereon, a cam carried on said cam plate capable of moving across the bar, carrying said bar, plate and pin down through an extra movement only upon the oscillation of the plunger, an interlocking mechanism comprising blocks supported under said pin, said pin upon its extra movement causing the movement of one or more of said interlocking blocks to release the interlocking mechanism.

135. In a machine for working on buttons, the combination of a casing, of a plunger reciprocating and oscillating therein, a cam plate fastened to said plunger, a bar mounted to reciprocate on said casing, said cam plate being normally carried over said bar without engaging the same during a portion of the oscillation, said plate engaging with said bar on the downward movement of the plunger and carrying said bar therewith, a plate mounted on said bar, a pin mounted thereon, a cam carried on said cam plate capable of moving across the bar, carrying said bar, plate and pin down through an extra movement only upon the oscillation of the plunger, an interlocking mechanism comprising blocks supported under said pin, said pin upon its extra movement causing the movement of one or more of said interlocking blocks, operating devices locked and interlocked by said blocks, said operating devices being released by the extra downward movement of said pin.

136. In a machine for working on buttons, the combination of a casing, of a plunger reciprocating and oscillating therein, a cam plate fastened to said plunger, a bar mounted to reciprocate on said casing, said cam plate being normally carried over said bar without engaging the same during a portion of the oscillation, said plate engaging with said bar on the downward movement of the plunger and carrying said bar therewith, said plunger being capable of oscillating with said plate, a cam on said plate engaging with said bar on the oscillation of the plunger to impart an extra movement thereto, devices for causing the oscillation of said plunger, said devices in their operation being controlled by the movement of said bar.

137. In a machine for working on buttons, the combination of a plunger, a cam plate keyed thereto, a plate pivotally mounted on said plunger adjacent thereto, a pin carried on said cam plate, with which said pivotally mounted plate engages, a coiled spring extending around said plunger and connected to said plates, holding the last named plate against said pin.

138. In a machine for working on buttons, the combination of a plunger, a cam plate keyed thereto, a plate pivotally mounted on said plunger adjacent thereto, a pin carried on said cam plate, with which said pivotally mounted plate engages, a coiled spring extending around said plunger and connected to said plates, holding the last named plate against said pin, said plates having recesses opening toward each other to house said spring.

139. In a machine for working on buttons, the combination of a casing, a pin mounted rigidly thereon, a plunger mounted to oscillate in said casing, a cam plate keyed to said plunger, a plate pivotally mounted on said plunger adjacent thereto, a coiled spring extending around said plunger and connected to said plates, holding both of said plates against the pin on the casing, means for rotating said plunger against the torsion of said spring, said spring operating to return said plunger to a uniform angular position.

140. In a machine for working on buttons, the combination of a plunger capable of longitudinal movement, means for oscillating said plunger in one direction at one end of its movement, means to withdraw said plunger through part of its movement and hold it while said plunger is being oscillated in the reverse direction, means for subsequently causing said plunger to complete its backward movement.

141. In a machine for working on buttons, the combination of a casing, a plunger mounted to reciprocate and oscillate therein, means for causing said plunger to reciprocate and oscillate therein, a series of keys controlling said oscillating means to vary the extent of the oscillation of said plunger, a main operating shaft for said machine having a cam thereon for lowering said plunger, a cam thereon oscillating said plunger, the second named cam operating to oscillate the plunger in one direction after the endwise movement thereof in one direction has been completed, the first named cam then operating to permit the raising of the plunger part way, the second named cam operating to oscillate the plunger in the reverse direction, after which the first named cam operates to restore the plunger to its original position.

142. In a machine for working on buttons, the combination of a casing with a plunger mounted to move endwise and oscillate therein, said plunger having a four-way endwise and oscillating movement in said casing and having an endwise movement in addition thereto.

143. In a machine for working on buttons, the combination of operating levers, an interlocking mechanism for controlling said levers, said interlocking mechanism comprising a channel with blocks sliding therein, means for yieldingly holding said blocks in a predetermined position with reference to said levers, some of said blocks being cup shaped at one end and flat on the other end, each of said levers operating to spread the blocks adjacent thereto and lock itself in engagement therewith and lock the remaining levers out of position, the blocks on one side of each of said levers being capable of movement away therefrom to release the lever locked thereby, the block on the other side of said lever moving to force said lever out of engagement with said blocks.

144. In a machine for working on buttons, the combination of a button locating plunger, a casing, a series of pins mounted to slide therein, a plate pivoted thereon with a series of levers pivotally mounted thereon, one of said levers being placed adjacent to each of said pins, said levers being movable on said plate into engageable position with said pins and being movable sidewise with said plate to operate said pins, said levers being locked by said pins against movement into engaging position therewith by the swinging of the plate toward said pins and means between said pins and said button locating plunger for oscillating said plunger.

145. In a machine for working on buttons, the combination of a chuck cup capable of carrying a button therein, a plunger having pins thereon capable of moving into engagement with the holes in said button, means controlled by the operator for causing said plunger to oscillate 90, 180, 270 degrees in one direction for the purpose of changing the angular position of the button thereby.

146. In a machine for working on buttons, the combination of a chuck cup capable of carrying a button therein, a plunger having pins thereon capable of moving into engagement with the holes in said button, means controlled by the operator for causing said plunger to oscillate 90, 180, or 270 degrees in one direction for the purpose of changing the angular position of the button thereby, means for withdrawing the plunger from the button, leaving the button in its advanced position in the chuck cup.

147. In a machine for working on buttons, the combination of a chuck cup having a button therein, a plunger having pins thereon movable longitudinally to engage its pins with the holes of the button in the chuck cup, gearing for rotating said plunger after it has engaged with the button, a series of keys controlling said gearing, by the depression of which said plunger may be caused to oscillate in one direction through either of a number of predetermined angular movements for the purpose of changing the angular position of the button.

148. In a machine for working on buttons, the combination of a chuck cup having a button therein, a plunger having pins thereon movable longitudinally to engage its pins with the holes of the button in the chuck cup, gearing for rotating said plunger after it has engaged with the button, a series of keys controlling said gearing, by the depression of which said plunger may be caused to oscillate in one direction through either of a number of predetermined movements for the purpose of changing the angular position of the button, means for withdrawing the plunger from the button, leaving the button in its advanced position and returning the plunger to its starting point.

149. In a machine for working on buttons, the combination of a chuck cup having a button therein, a plunger having pins thereon movable longitudinally to engage its pins with the holes of the button in the chuck cup, gearing for rotating said plunger after it has engaged with the button, a series of keys controlling said gearing, by the depression of which said plunger may be caused to oscillate in one direction through either of a number of predetermined movements for the purpose of changing the angular position of the button, said plunger moving into and out of engagement with the button without changing the angular position thereof when the keys remain idle.

150. In a machine for working on buttons, the combination of a chuck cup having a button therein, a plunger having pins thereon movable longitudinally to engage its pins with the holes of the button in the chuck cup, gearing for rotating said plunger after it has engaged with the button, a series of keys controlling said gearing, by the depression of which said plunger may be caused to oscillate in one direction through either of a number of predetermined movements for the purpose of changing the angular position of the button, means for withdrawing the plunger from the button, leaving the button in its advanced position and returning the plunger to its starting point, said plunger moving into and out of engagement with the button without changing the angular position thereof when the keys remain idle.

151. In a machine for working on buttons, the combination of a ram, a housing attached thereto, a die block adjustable laterally in said housing, anvil blocks stationary in said housing and bearing against said ram, dies carried in said die block and adjustable therewith on said anvil blocks in the housing.

152. In a machine for working on buttons, the combination of a ram, a housing attached thereto, a die block adjustable laterally in said housing, anvil blocks stationary in said housing and bearing against said ram, dies carried in said die block and adjustable therewith on said anvil blocks in the housing, bushings in said die block movable laterally of said dies for clamping the dies between said bushings and said die blocks.

153. In a machine for working on buttons, the combination of a ram, a housing attached thereto, a die block adjustable laterally in said housing, anvil blocks stationary in said housing and bearing against said ram, dies carried in said die block and adjustable therewith on said anvil blocks in the housing, bushings in said die block movable laterally of said dies for clamping the dies between said bushings and said die blocks, means for clamping said die block in said housing and to said ram.

154. In a machine for working on buttons, the combination of a dial plate revolving around a central stem, cups for supporting buttons carried on said dial plate, a nozzle rigidly supported on said central stem and having its tip adjacent to the line of travel of said cups, means for causing a blast of air to blow through said nozzle against the cup as it passes said nozzle.

155. In a machine for working on buttons, the combination of a dial plate revolving around a central stem, cups supporting buttons carried on said dial plate, a nozzle rigidly supported on said central stem and having its tip adjacent to the line of travel of said cups, means for causing a blast of air to blow through said nozzle against the cup as it passes said nozzle, gripping fingers around said cup adapted to hold a button therein, means for freeing the button from said fingers when the air blast strikes said button, said fingers being adapted to positively engage over the upper edge of the button to hold the button in the cup.

156. In a machine for working on buttons, the combination of a dial plate, a pneumatic ejector central thereof, said ejector comprising a stem, a housing mounted thereon, a valve mounted to rotate in said housing, a passage in said valve, perforations uniformly spaced extending from the outside of the valve to the passage, perforations through said housing spaced apart so as to simultaneously register with two perforations in said valve, the perforations in said housing and valve permitting an intermittent current of air to flow from the housing through the valve and out through the housing on the rotation of the valve.

157. In a machine for working on buttons, the combination of a pneumatic ejector comprising a valve having an inner and outer ring, a groove in one of said rings closed by the other of said rings, equally spaced perforations extending through one of said rings to said groove.

158. In a machine for working on buttons, the combination of a pneumatic ejector comprising a valve having an inner and outer ring, a groove in one of said rings closed by the other of said rings, equally spaced perforations extending through one of said rings to said groove, said outer ring being cone shaped, a housing having a cone shaped seat therein in which said valve is adapted to rotate, means for pressing said valve in its seat.

159. In a machine for working on buttons, the combination of a pneumatic ejector comprising a valve having an inner and outer ring, a groove in one of said rings closed by the other of said rings, equally spaced perforations extending through one of said rings to said groove, said outer ring being cone shaped, a housing having a cone shaped seat therein in which said valve is adapted to rotate, means for pressing said valve in its seat, perforations through said housing spaced apart so as to simultaneously register with two perforations in the valve on the rotation of the valve.

160. In a machine for working on buttons, the combination of a shaft, a gear oscillating around said shaft, a key for locking said gear to said shaft and causing the shaft to oscillate therewith, means for holding said key in engagement with the shaft during the complete oscillation.

161. In a machine for working on buttons, the combination of a shaft, a gear oscillating around said shaft, a key for locking said gear to said shaft and causing the shaft to oscillate therewith, means for holding said key in engagement with the shaft during the complete oscillation, and means for ejecting the key from the shaft at the end of the oscillation.

162. In a machine for working on buttons, the combination of a dial plate, a cup yieldingly mounted therein, a pawl pivotally mounted in the path of travel of said cup, said pawl being capable of lifting said cup, means for positively lifting said pawl and cup, means for yieldingly holding said pawl elevated, said means permitting the pawl to be pressed back to normal position, means for firmly holding said pawl in normal position so as to afford a rigid seat for the cup resting thereon.

163. In a machine for working on buttons, the combination of a frame, a dial plate rotating thereon, chuck cups and supporting rings mounted thereon, plates yieldingly supported on said dial plate flush with the surface thereof, said plates filling the intervals in said dial plate between consecutive cup supporting rings.

164. In a machine for working on buttons, the combination of a frame supporting a button feeding device and a button locating and turning plunger operating in connection therewith, a second button turning plunger, a ram having embossing dies therein, and an ejector, a dial plate having a plurality of chuck receiving cups therein mounted to rotate adjacent to said first named devices and adapted to present said cups successively to each of them.

165. In a machine for working on buttons, the combination of a frame supporting a button feeding device and a button locating and turning plunger operating in connection therewith, a second button turning plunger, a ram having embossing dies therein, and an ejector, a dial plate having a plurality of chuck receiving cups therein mounted to rotate adjacent to said first named devices and adapted to present said cups successively to each of them, each of said cups receiving a button from the feeding device, said button receiving its first location from the plunger operating with the feeding device, said dial plate rotating to expose said button to inspection, then to carry the button to the second plunger for further location thereby, then to the embossing dies for impression thereby, then to the ejector for removal from the machine.

166. In a machine for working on buttons, the combination of a dial plate, having a chuck cup therein, means for rotating said dial plate by a plurality of intermittent steps carrying said cup to a plurality of positions, said cup being capable of holding a button therein, mechanism for turning the button in the cup when the cup is in its third position, means for controlling the operation of said mechanism, said means being capable of being set for selected operation before the cup containing the button leaves its second position.

167. In a machine for working on buttons, the combination of a dial plate having a chuck cup therein, means for rotating said dial plate by a plurality of intermittent steps carrying said cup to a plurality of positions, said cup being capable of holding a button therein, mechanism for turning the button in the cup when the cup is in its third position, means for controlling the operation of said mechanism, said means being capable of being set for selected operation after the cup has left its second position.

168. In a machine for working on buttons, the combination of a dial plate having a chuck cup therein, means for rotating said dial plate by a plurality of intermittent steps carrying said cup to a plurality of positions, said cup being capable of holding a button therein, mechanism for turning the button in the cup when the cup is in its third position, means for controlling the operation of said mechanism, said means being capable of being set for selected operation while said cup is traveling from its second to its third position.

169. In a machine for working on buttons, the combination of a dial plate having a chuck cup therein, means for rotating said dial plate by a plurality of intermittent steps carrying said cup to a plurality of positions, said cup being capable of holding a button therein, mechanism for turning the button in the cup when the cup is in its third position, means for controlling the operation of said mechanism, said means being capable of being set for selected operation, after said cup has reached its third position.

170. In a machine for working on buttons, the combination of a dial plate, having a chuck cup therein, means for rotating said dial plate by a plurality of intermittent steps carrying said cup to a plurality of positions, said cup being capable of holding a button therein, mechanism for turning the button in the cup when the cup is in its third position, means for controlling the operation of said mechanism, said means being capable of being set for selected operation before said cup leaves its second position or while it is traveling from its second to its third position, or after it has reached its third position.

171. In a machine for working on buttons, the combination of a dial plate, a chuck ring mounted therein, a chuck cup mounted to move vertically in said chuck ring, means mounted in said machine in the path of travel of said chuck cup for lifting said chuck cup in said chuck ring.

172. In a machine for working on buttons, the combination of a dial plate having a chuck cup therein, means for rotating said dial plate by intermittent steps, said dial plate in its rotation carrying said chuck cup first to a mechanism for feeding a button and locating it therein with its perforations in a predetermined position, and then to an embossing mechanism operating to emboss a pattern on the button in said cup.

173. In a machine for working on buttons, the combination of a plunger, a shaft mounted to oscillate adjacent thereto, gearing between said plunger and said shaft whereby the uniform oscillation of said shaft can produce different oscillations of said plunger, a pinion on said shaft, a rack engaging therewith and means for driving said rack in both directions.

174. In a machine for working on buttons, the combination of a chuck cup capable of carrying a button therein, a plunger having pins thereon capable of moving into engagement with the holes in said button, means controlled by the operator for causing said plunger to oscillate the required number of degrees in one direction for the purpose of changing the angular position of the button thereby.

In testimony whereof I affix my signature in presence of two witnesses.

HERBERT HASTINGS.

Witnesses:
ERIC ISCHINGER,
LENA M. ASH.

Copies of this patent may be obtained for five cents each, by addressing the "Commissioner of Patents, Washington, D. C."